US012677015B2

(12) United States Patent
Riedmiller et al.

(10) Patent No.: US 12,677,015 B2
(45) Date of Patent: Jul. 7, 2026

(54) MULTISOURCE METHODS AND SYSTEMS FOR CODED MEDIA

(71) Applicant: Dolby Laboratories Licensing Corporation, San Francisco, CA (US)

(72) Inventors: Jeffrey Riedmiller, Novato, CA (US); Freddie Sanchez, Berkeley, CA (US); Mingchao Yu, Sydney (AU); Jason Michael Cloud, Clayton, CA (US); Elliot Osborne, Neutral Bay (AU); Thomas Franklin Antioch, Rhodes (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/857,447

(22) PCT Filed: Apr. 13, 2023

(86) PCT No.: PCT/US2023/018469
§ 371 (c)(1),
(2) Date: Oct. 16, 2024

(87) PCT Pub. No.: WO2023/205025
PCT Pub. Date: Oct. 26, 2023

(65) Prior Publication Data
US 2026/0006268 A1 Jan. 1, 2026

Related U.S. Application Data

(60) Provisional application No. 63/443,933, filed on Feb. 7, 2023, provisional application No. 63/332,212, filed
(Continued)

(51) Int. Cl.
*H04N 19/00* (2014.01)
*H04N 19/119* (2014.01)
(Continued)

(52) U.S. Cl.
CPC ....... *H04N 21/2353* (2013.01); *H04N 19/119* (2014.11); *H04N 19/70* (2014.11)

(58) Field of Classification Search
CPC ... H04N 21/2353; H04N 19/119; H04N 19/70
See application file for complete search history.

(56) References Cited

U.S. PATENT DOCUMENTS 7,272,555 B2 9/2007 Lee
8,335,684 B2 12/2012 Thyssen
(Continued)

FOREIGN PATENT DOCUMENTS

EP 1670256 A2 6/2006

OTHER PUBLICATIONS

ISO 639.2: "Codes for the representation of names of languages" https://www.loc.gov/standards/iso639-2/php/code_list.php, Jul. 22, 2024, accessed Oct. 15, 2024, p. 1-17, 17 pages.
(Continued)

*Primary Examiner* — Frank F Huang

(57) ABSTRACT

Enclosed are embodiments for multisource methods and systems for coded media. In some embodiments, a method comprises: at a first device: receiving media data representing a media asset; obtaining a first plurality of data elements including at least one of bitstream identification data, content-specific encode data and media segment data; encoding at least a portion of the media data in accordance with a first coding process into coded data corresponding to the media asset; generating a second plurality of data elements different from the first plurality of data elements based on information associated with the first coding process; combining the first plurality of data elements and the second plurality of data elements into one or more coded bitstreams
(Continued)

representing the media asset; and transmitting the one or more coded bitstreams to one or more second devices using one or more network paths.

28 Claims, 29 Drawing Sheets

Related U.S. Application Data on Apr. 18, 2022, provisional application No. 63/332, 210, filed on Apr. 18, 2022.

(51) Int. Cl.
   H04N 19/70          (2014.01)
   H04N 21/235         (2011.01)

(56)                References Cited

U.S. PATENT DOCUMENTS

| | | | | |
|---|---|---|---|---|
| 8,692,697 | B2 | 4/2014 | Xu | |
| 8,989,508 | B2 * | 3/2015 | Deshpande | H04N 19/44 |
| | | | | 708/203 |
| 9,049,427 | B2 * | 6/2015 | Hattori | G11B 20/1252 |
| 9,208,796 | B2 | 12/2015 | Thepie Fapi | |
| 9,319,703 | B2 * | 4/2016 | Wang | H04N 19/463 |
| 9,969,299 | B2 * | 5/2018 | Murase | B60L 5/42 |
| 10,229,692 | B2 | 3/2019 | Sung | |
| 10,313,698 | B2 * | 6/2019 | Sullivan | H04N 21/23424 |
| 10,623,753 | B2 * | 4/2020 | Skupin | H04N 23/698 |
| 11,108,705 | B2 | 8/2021 | Fouli | |
| 11,232,805 | B2 * | 1/2022 | Schreiner | G10L 19/008 |
| 11,430,463 | B2 * | 8/2022 | Cengarle | H03G 9/025 |
| 11,522,907 | B2 * | 12/2022 | George | H04L 63/1416 |
| 11,528,128 | B2 * | 12/2022 | Straub | H04L 9/0819 |
| 11,533,352 | B2 * | 12/2022 | Gordon | H04L 65/612 |
| 11,553,217 | B2 * | 1/2023 | Jayawardene | H04N 21/23103 |
| 11,582,279 | B2 * | 2/2023 | Panagos | H04L 67/568 |
| 11,700,390 | B2 * | 7/2023 | Wang | H04N 19/174 |
| | | | | 375/240.02 |
| 11,743,505 | B2 * | 8/2023 | Wang | G06V 20/46 |
| | | | | 375/240.02 |
| 11,765,394 | B2 * | 9/2023 | Wang | H04N 19/187 |
| | | | | 375/240.25 |
| 11,812,062 | B2 * | 11/2023 | Wang | H04N 19/46 |
| 12,022,122 | B2 * | 6/2024 | Deshpande | H04N 19/423 |
| 12,034,927 | B2 * | 7/2024 | Okawa | H04N 19/70 |
| 12,067,992 | B2 * | 8/2024 | Laaksonen | G10L 19/173 |
| 2014/0086336 | A1 * | 3/2014 | Wang | H04N 19/149 |
| | | | | 375/240.26 |
| 2015/0271541 | A1 * | 9/2015 | Gonder | H04N 21/64322 |
| | | | | 725/25 |
| 2018/0012610 | A1 * | 1/2018 | Riedmiller | G10L 21/0316 |
| 2021/0082448 | A1 | 3/2021 | Johnston | |
| 2024/0205439 | A1 * | 6/2024 | Sjöberg | H04N 19/85 |
| 2024/0236366 | A1 * | 7/2024 | Choi | H04N 19/60 |
| 2024/0292003 | A1 * | 8/2024 | Damghanian | H04N 19/188 |

OTHER PUBLICATIONS

Chau et al., Hierarchical random linear network coding for multicast scalable video streaming, Signal and Information Processing Association Annual Summit and Conference (APSIPA), 2014 Asia-Pacific, Siem Reap, Cambodia, 2014, pp. 1-7, 7 pages.

EIDR: ID Format Ver 1.51 Oct. 5, 2017, Entertainment Identifier Registry, pp. 1-19, 19 pages.

Freed et al., IETF RFC 4288 Media Type Specifications and Registration Procedures, Media Type Registration, Best Practice, Dec. 2005, pp. 1-24, 24 pages.

Gellens et al., IETF RFC 6381 The 'Codecs' and 'Profiles' Parameters for "Bucket" Media Types, MIME Codecs and Profiles, Standards Track, Aug. 2011, pp. 1-19, 19 pages.

ISO/IEC 23009-1, Information technology—Dynamic adaptive streaming over HTTP (DASH)—Part 1: Media presentation description and segment formats, Fifth edition, Aug. 2022, pp. 1-330, 330 pages.

Lacan et al., IETF RFC 5510 Reed-Solomon Forward Error Correction (FEC) Schemes, Reed-Solomon Forward Error Correction, Standards Track, Apr. 2009, pp. 1-28, 28 pages.

Luby et al., IETF RFC 6330 RaptorQ Forward Error Correction Scheme for Object Delivery, RaptorQ FEC Scheme, Standards Track, Aug. 2011, pp. 1-69, 69 pages.

Shashi, Transcoding Transport Stream MPEG2, Thesis, University of Missouri—Columbia, May 1, 2007, pp. 1-93, 93 pages.

Sprljan et al., A fast error protection scheme for transmission of embedded coded images over unreliable channels and fixed packet size, Proceedings. (ICASSP '05). IEEE International Conference on Acoustics, Speech, and Signal Processing, 2005., Philadelphia, PA, USA, 2005, vol. 3, pp. iii/741-iii/744, 5 pages.

Wold, IETF RFC 8107 Advertising Digital Identifier (Ad-ID), Ad-ID Urn Namespace Definition, Informational, Mar. 2017, pp. 1-7, 7 pages.

* cited by examiner

STEP 1: PARTITION EACH BLOCK INTO SOURCE SYMBOLS

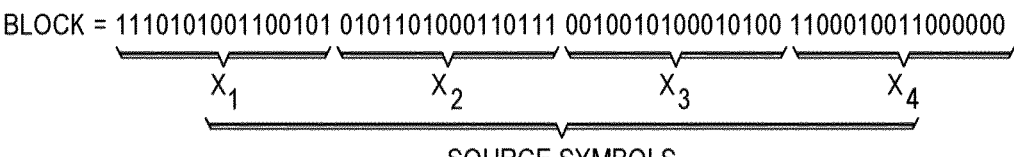

BLOCK = 1110101001100101 0101101000110111 0010010100010100 1100010011000000

$X_1$     $X_2$     $X_3$     $X_4$

SOURCE SYMBOLS

STEP 2: FORM THE VECTOR X

$$X = \begin{bmatrix} X_1 \\ X_2 \\ X_3 \\ X_4 \end{bmatrix}$$

STEP 3: GENERATE A 6x4 MATRIX G WHERE EACH ELEMENT IS CHOSEN FROM A FIELD GF(q). LABEL EACH ELEMENT $a_{i\_j}$ i = (1, ..., 6) AND j = (1, ..., 4).

COEFFICIENT VECTOR FOR $y_1$

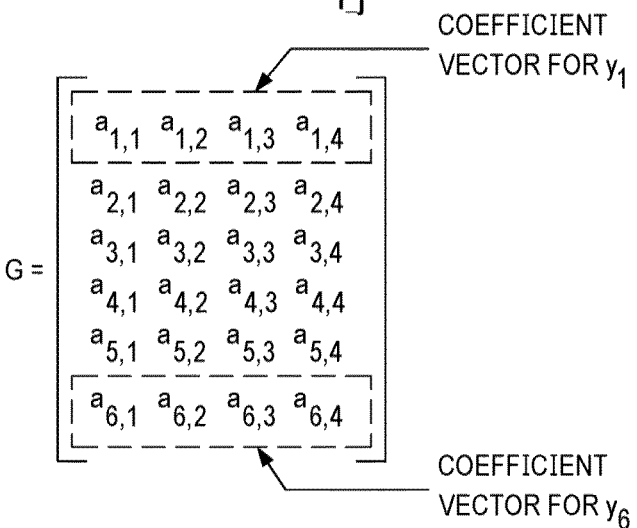

$$G = \begin{bmatrix} a_{1,1} & a_{1,2} & a_{1,3} & a_{1,4} \\ a_{2,1} & a_{2,2} & a_{2,3} & a_{2,4} \\ a_{3,1} & a_{3,2} & a_{3,3} & a_{3,4} \\ a_{4,1} & a_{4,2} & a_{4,3} & a_{4,4} \\ a_{5,1} & a_{5,2} & a_{5,3} & a_{5,4} \\ a_{6,1} & a_{6,2} & a_{6,3} & a_{6,4} \end{bmatrix}$$

COEFFICIENT VECTOR FOR $y_6$

CODED SYMBOL $y_1$

STEP 4: MULTIPLY G WITH X TO FORM EACH CODED SYMBOL.

$$Y = GX = \begin{bmatrix} a_{1,1} & a_{1,2} & a_{1,3} & a_{1,4} \\ a_{2,1} & a_{2,2} & a_{2,3} & a_{2,4} \\ a_{3,1} & a_{3,2} & a_{3,3} & a_{3,4} \\ a_{4,1} & a_{4,2} & a_{4,3} & a_{4,4} \\ a_{5,1} & a_{5,2} & a_{5,3} & a_{5,4} \\ a_{6,1} & a_{6,2} & a_{6,3} & a_{6,4} \end{bmatrix} \begin{bmatrix} X_1 \\ X_2 \\ X_3 \\ X_4 \end{bmatrix} = \begin{bmatrix} a_{1,1}X_1 + a_{1,2}X_2 + a_{1,3}X_3 + a_{1,4}X_4 \\ a_{2,1}X_1 + a_{2,2}X_2 + a_{2,3}X_3 + a_{2,4}X_4 \\ a_{3,1}X_1 + a_{3,2}X_2 + a_{3,3}X_3 + a_{3,4}X_4 \\ a_{4,1}X_1 + a_{4,2}X_2 + a_{4,3}X_3 + a_{4,4}X_4 \\ a_{5,1}X_1 + a_{5,2}X_2 + a_{5,3}X_3 + a_{5,4}X_4 \\ a_{6,1}X_1 + a_{6,2}X_2 + a_{6,3}X_3 + a_{6,4}X_4 \end{bmatrix} = \begin{bmatrix} y_1 \\ y_2 \\ y_3 \\ y_4 \\ y_5 \\ y_6 \end{bmatrix}$$

CODED SYMBOL $y_6$

FIG. 1A

STEP 1: DETERMINE THE COEFFICIENT VECTOR ASSOCIATED WITH EACH
RECEIVED CODED SYMBOL $Y_i$. THIS VECTOR BECOMES ROW i IN THE MATRIX A.

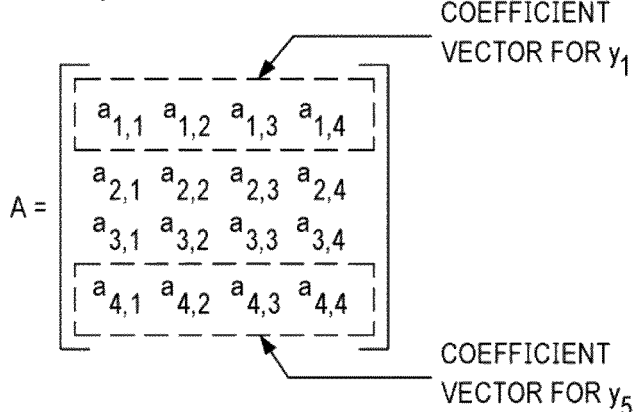

COEFFICIENT
VECTOR FOR $y_1$

COEFFICIENT
VECTOR FOR $y_5$

STEP 2: TAKE THE INVERSE OF A TO FORM $A^{-1}$ $$A^{-1} = INVERSE(A)$$

STEP 3: MULTIPLY $A^{-1}$ WITH THE VECTOR OF CODED
SYMBOLS $y_i$ TO RECOVER THE VECTOR OF $x_i$'a

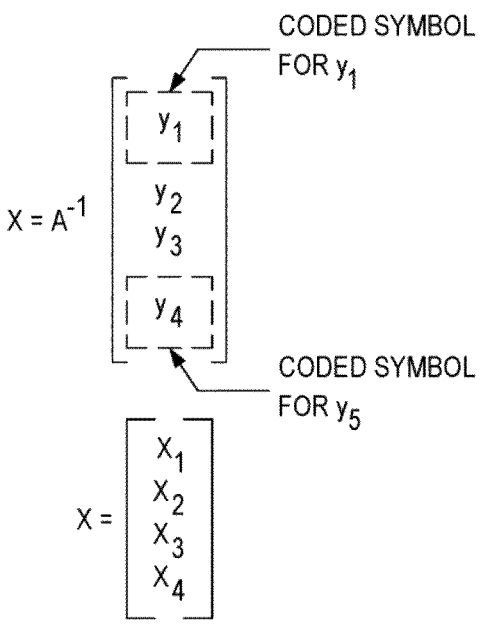

CODED SYMBOL
FOR $y_1$

CODED SYMBOL
FOR $y_5$

STEP 4: CONCATENATE EACH SYMBOL $x_i$ TOGETHER TO REFORM THE BLOCK.

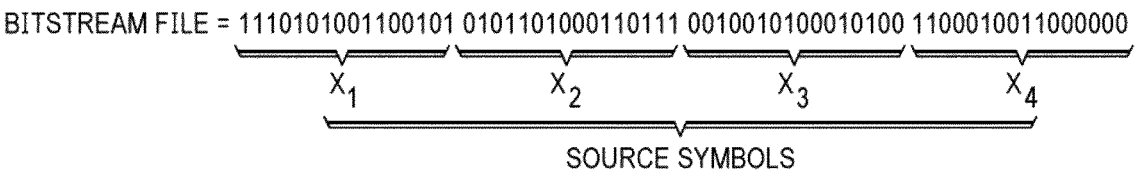

BITSTREAM FILE = 1110101001100101 0101101000110111 0010010100010100 1100010011000000

$X_1$          $X_2$          $X_3$          $X_4$

SOURCE SYMBOLS

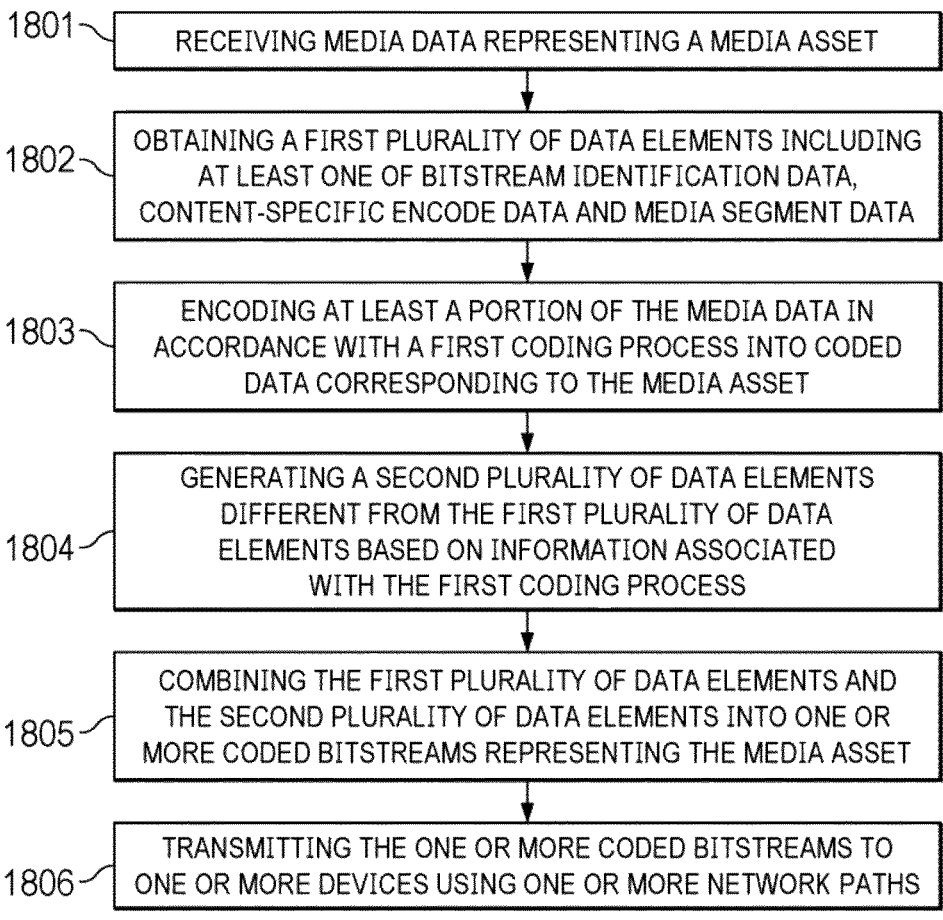

1801 — RECEIVING MEDIA DATA REPRESENTING A MEDIA ASSET

1802 — OBTAINING A FIRST PLURALITY OF DATA ELEMENTS INCLUDING AT LEAST ONE OF BITSTREAM IDENTIFICATION DATA, CONTENT-SPECIFIC ENCODE DATA AND MEDIA SEGMENT DATA

1803 — ENCODING AT LEAST A PORTION OF THE MEDIA DATA IN ACCORDANCE WITH A FIRST CODING PROCESS INTO CODED DATA CORRESPONDING TO THE MEDIA ASSET

1804 — GENERATING A SECOND PLURALITY OF DATA ELEMENTS DIFFERENT FROM THE FIRST PLURALITY OF DATA ELEMENTS BASED ON INFORMATION ASSOCIATED WITH THE FIRST CODING PROCESS

1805 — COMBINING THE FIRST PLURALITY OF DATA ELEMENTS AND THE SECOND PLURALITY OF DATA ELEMENTS INTO ONE OR MORE CODED BITSTREAMS REPRESENTING THE MEDIA ASSET

1806 — TRANSMITTING THE ONE OR MORE CODED BITSTREAMS TO ONE OR MORE DEVICES USING ONE OR MORE NETWORK PATHS

FIG. 18

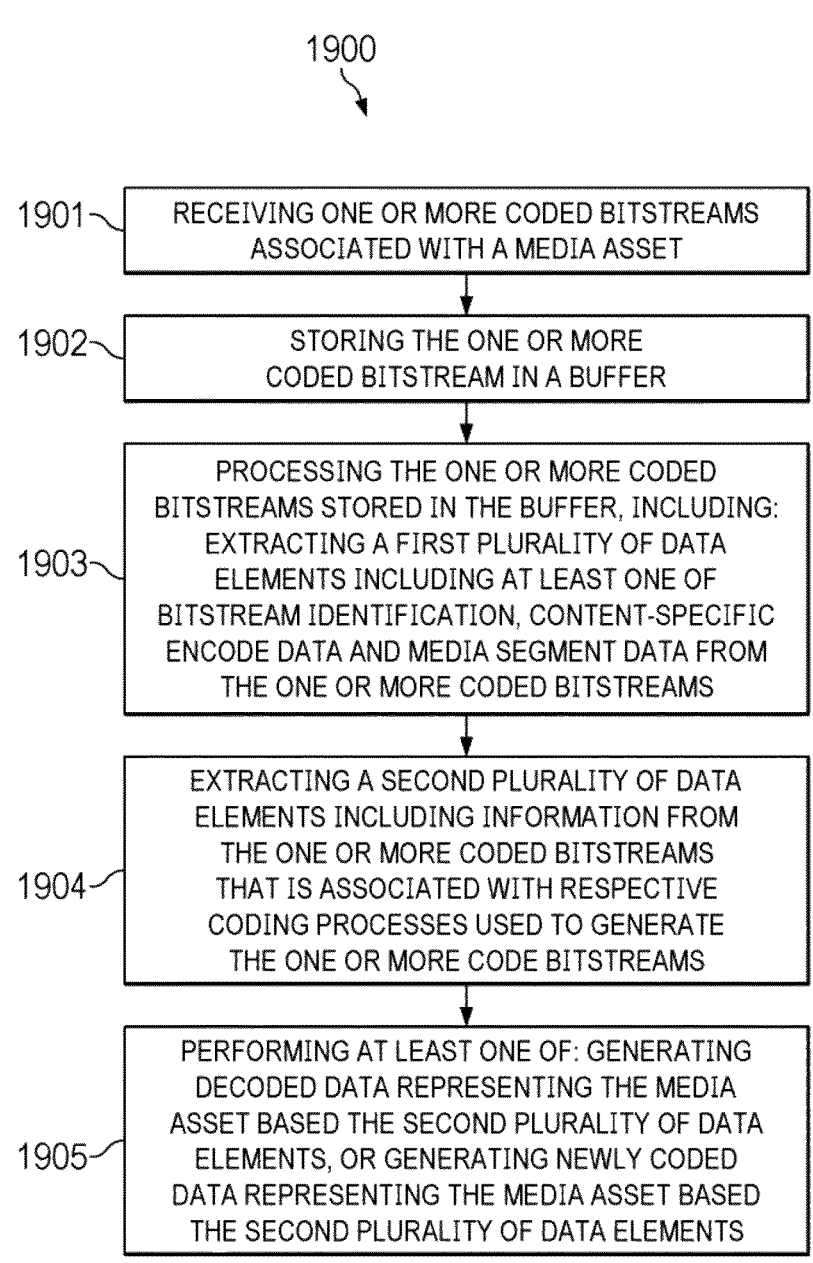

1900

1901 — RECEIVING ONE OR MORE CODED BITSTREAMS ASSOCIATED WITH A MEDIA ASSET

1902 — STORING THE ONE OR MORE CODED BITSTREAM IN A BUFFER

1903 — PROCESSING THE ONE OR MORE CODED BITSTREAMS STORED IN THE BUFFER, INCLUDING: EXTRACTING A FIRST PLURALITY OF DATA ELEMENTS INCLUDING AT LEAST ONE OF BITSTREAM IDENTIFICATION, CONTENT-SPECIFIC ENCODE DATA AND MEDIA SEGMENT DATA FROM THE ONE OR MORE CODED BITSTREAMS

1904 — EXTRACTING A SECOND PLURALITY OF DATA ELEMENTS INCLUDING INFORMATION FROM THE ONE OR MORE CODED BITSTREAMS THAT IS ASSOCIATED WITH RESPECTIVE CODING PROCESSES USED TO GENERATE THE ONE OR MORE CODE BITSTREAMS

1905 — PERFORMING AT LEAST ONE OF: GENERATING DECODED DATA REPRESENTING THE MEDIA ASSET BASED THE SECOND PLURALITY OF DATA ELEMENTS, OR GENERATING NEWLY CODED DATA REPRESENTING THE MEDIA ASSET BASED THE SECOND PLURALITY OF DATA ELEMENTS

FIG. 19

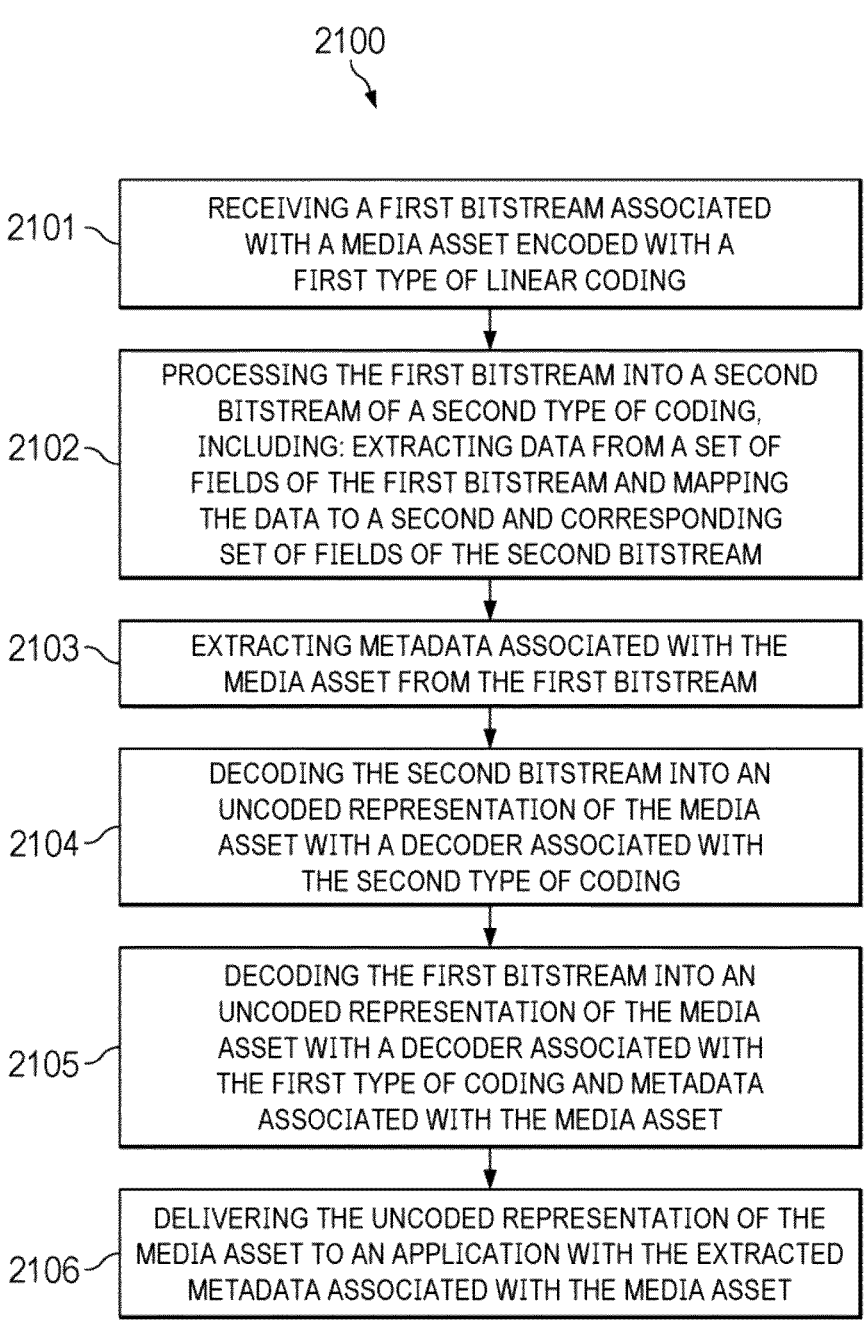

2100

2101 — RECEIVING A FIRST BITSTREAM ASSOCIATED WITH A MEDIA ASSET ENCODED WITH A FIRST TYPE OF LINEAR CODING

2102 — PROCESSING THE FIRST BITSTREAM INTO A SECOND BITSTREAM OF A SECOND TYPE OF CODING, INCLUDING: EXTRACTING DATA FROM A SET OF FIELDS OF THE FIRST BITSTREAM AND MAPPING THE DATA TO A SECOND AND CORRESPONDING SET OF FIELDS OF THE SECOND BITSTREAM

2103 — EXTRACTING METADATA ASSOCIATED WITH THE MEDIA ASSET FROM THE FIRST BITSTREAM

2104 — DECODING THE SECOND BITSTREAM INTO AN UNCODED REPRESENTATION OF THE MEDIA ASSET WITH A DECODER ASSOCIATED WITH THE SECOND TYPE OF CODING

2105 — DECODING THE FIRST BITSTREAM INTO AN UNCODED REPRESENTATION OF THE MEDIA ASSET WITH A DECODER ASSOCIATED WITH THE FIRST TYPE OF CODING AND METADATA ASSOCIATED WITH THE MEDIA ASSET

2106 — DELIVERING THE UNCODED REPRESENTATION OF THE MEDIA ASSET TO AN APPLICATION WITH THE EXTRACTED METADATA ASSOCIATED WITH THE MEDIA ASSET

FIG. 21

MULTISOURCE METHODS AND SYSTEMS FOR CODED MEDIA

CROSS-REFERENCE TO RELATED APPLICATIONS

This application is a U.S. National Stage application under U.S.C. 371 of International Application No. PCT/US2023/018469, filed on Apr. 13, 2023, which claims the benefit priority of U.S. Provisional Patent Application No. 63/332,210 filed Apr. 18, 2022, U.S. Provisional Patent Application No. 63/332,212 filed Apr. 18, 2022, and U.S. Provisional Patent Application No. 63/443,933 filed Feb. 7, 2023, each of which is incorporated by reference in their entireties.

TECHNICAL FIELD

This disclosure relates generally to encoding and decoding media.

BACKGROUND

Application-layer coding is an approach that can be used to mitigate the effects that lower layer protocols, networks and channels have on the overall quality of a transmission of data from one or more sources to one or more receivers. The data transfer rate through a network depends heavily on the characteristics of the network (e.g., congestion, packet loss, latency, etc.). Application-layer coding seeks to optimize data transfer by selecting an appropriate coding type given knowledge of the network characteristics (e.g., network capacity, latency, etc.), the specific use case (e.g., online streaming) and the overall objective (e.g., minimize latency).

SUMMARY

Enclosed are embodiments for multisource methods and systems for coded media.

In some embodiments, a method comprises: at a first device: receiving media data representing a media asset; obtaining a first plurality of data elements including at least one of bitstream identification data, content-specific encode data and media segment data; encoding at least a portion of the media data in accordance with a first coding process into coded data corresponding to the media asset; generating a second plurality of data elements different from the first plurality of data elements based on information associated with the first coding process; combining the first plurality of data elements and the second plurality of data elements into one or more coded bitstreams representing the media asset; and transmitting the one or more coded bitstreams to one or more second devices using one or more network paths.

In some embodiments, the first coding process is a linear coding process to obtain coded data corresponding to the media asset.

In some embodiments, the first coding process is a nonlinear coding process that transforms the media data into the coded data consistent with another linear coding process.

In some embodiments, the data elements are data structures.

In some embodiments, the first plurality of data elements includes a synchronization data element, and each of the one or more coded bitstreams begins with a synchronization data element.

In some embodiments, the synchronization data element includes at least one of: identification data identifying a respective coded bitstream of the one or more coded bitstreams as being generated from a common source media asset; synchronization data for synchronizing the respective coded bitstream of the one or more coded bitstreams with other coded bitstreams generated from the common source media asset; and lineage data of the respective coded bitstream of the one or more coded bitstreams.

In some embodiments, lineage data includes data identifying original or coded symbols used to generate the coded symbols included in the respective coded bitstream, data identifying how original or coded symbols were combined to generate the coded symbols included in the respective coded bitstream and data identifying encoding coefficients used to generate the coded symbols included in the respective coded bitstream.

In some embodiments, the method further comprises: interleaving synchronization data elements throughout the one or more coded bitstreams, the synchronization data elements enabling a second electronic device receiving one of the one or more coded bitstreams to initiate decoding from a plurality of points within the one of the one or more coded bitstreams.

In some embodiments, the first plurality of data elements or the second plurality of data elements are generated based at least in part on system data associated with the received media data.

In some embodiments, the method further comprises: obtaining a first plurality of data elements includes generating the first plurality of data elements from the received media data or system data associated with the received media data.

In some embodiments, encoding the media data in accordance with a first coding process includes partitioning the media data into a plurality of original symbols and generating a plurality of coded symbols based on the plurality of original symbols.

In some embodiments, a coded symbol is generated by linearly combining a subset of the plurality of original symbols in accordance with a network coding technique.

In some embodiments, the media data includes a linear coded bitstream.

In some embodiments, obtaining a first plurality of data elements includes: extracting metadata from the media data; and computing the first plurality of data elements from the extracted metadata.

In some embodiments, metadata is extracted from the media data without performing linear decoding.

In some embodiments, encoding the media data in accordance with a first coding process includes re-encoding linear coded symbols in the coded bitstream into new linear coded symbols representing the media asset.

In some embodiments, the method further comprises: prior to combining, partitioning one or more data elements having a first size into data elements having a second sized smaller than the first size.

In some embodiments, the method further comprises: adding hash data to one or more data elements of the second plurality of data elements enabling at least one of validation, authentication, or integrity by a device receiving the one or more bitstreams.

In some embodiments, the method further comprises: adding hash data to one or more data elements of the second plurality of data elements that are associated with one or more of: a file corresponding to the media asset, a block of the media asset, a segment of the media asset and a packet of the media asset.

In some embodiments, combining includes inserting a directory data element into the one or more coded bitstreams.

In some embodiments, the directory data element is used to assist a receiving device in identifying subatoms within each bitstream.

In some embodiments, the one or more coded bitstreams include a first coded bitstream including data elements of a first type and a second coded bitstream not including data elements of the first type.

In some embodiments, the data elements or subatoms used to initialize a decoder on a client are not latency sensitive data.

In some embodiments, a bitstream includes a sync( ) subatom and at least one of a bitstream_header( ), block-_header( ), encoder_content_info( ) or media_seg-ment_info( ) subatoms.

In some embodiments, the data elements or subatoms carry encoded data or latency sensitive data.

In some embodiments, a bitstream includes packet( ) subatoms and sync( ) subatoms but does not include at least one of the bitstream_header( ), block_header( ), encoder-_content_info( ) or media_segment_info( ) subatoms).

In some embodiments, transmitting includes: transmitting the first coded bitstream using a communication channel of a first type; and transmitting the second coded bitstream using a communication channel of a second type different from the first type.

In some embodiments, the second type of communication channel is at least one of a higher latency channel, a lower bandwidth channel, a reliable channel or a channel using a second type of transmission protocol different than the first type of transmission protocol.

In some embodiments, a method comprises: at a first device: receiving one or more coded bitstreams associated with a media asset; storing the one or more coded bitstreams in a buffer: processing the one or more coded bitstreams stored in the buffer, including: extracting a first plurality of data elements including at least one of bitstream identification data, content-specific encode data and media segment data from the one or more coded bitstreams: and extracting a second plurality of data elements including information from the one or more coded bitstreams that is associated with respective coding processes used to generate the one or more code bitstreams; and performing one of: generating decoded data representing the media asset based the second plurality of data elements; and generating newly coded data representing the media asset based the second plurality of data elements.

In some embodiments, generating decoded data includes decoding coded data with a respective decoder of a plurality of decoders in accordance with a determination of an encoding type used to generate the coded data.

In some embodiments, the encoding type is determined from the extracted first plurality of data elements.

In some embodiments, the encoding type is determined from the extracted second plurality of data elements.

In some embodiments, the encoding type is determined from the first plurality of data elements without using the extracted second plurality of data elements.

In some embodiments, the encoding type is determined from the second plurality of data elements without using the extracted first plurality of data elements.

In some embodiments, the method further comprises generating consumable data corresponding to the media asset from the decoded data and the first plurality of data elements.

In some embodiments, the consumable data is compatible with an application executing on the first electronic device or a media file type supported by an application.

In some embodiments, generating decoded data further comprises: processing coded data of a first type into coded data of a second type without performing linear coding; and decoding the coded data of the second type using a decoder capable of decoding coded data of the second type.

In some embodiments, processing the coded data is performed by a coding unifier that aligns coefficients or projects the coded data to a common finite field.

In some embodiments, generating newly coded data includes processing coded data included in the second plurality of data elements with a respective re-encoder of a plurality of re-encoders in accordance with a determination of an encoding type used to generate the coded data.

In some embodiments, the encoding type is determined from the extracted first plurality of data elements.

In some embodiments, the encoding type is determined from the extracted the extracted second plurality of data elements.

In some embodiments, the encoding type is determined from the first plurality of data elements without using the extracted second plurality of data elements.

In some embodiments, the encoding type is determined from the second plurality of data elements without using the extracted first plurality of data elements.

In some embodiments, generating newly coded data includes: processing coded data of a first type into coded data of a second type without performing linear de-coding; and re-encoding the coded data of the second type using re-encoder capable of encoding coded data of the second type.

In some embodiments, processing coded data is performed by a coding unifier that aligns coefficients or projects the coded data to a common finite field.

In some embodiments, the method further comprises: storing the newly coded data or generating one or more bitstreams from the newly coded data.

In some embodiments, the method further comprises: prior processing to the one or more coded bitstreams stored in the buffer, combining a first quantity of data elements of the first plurality of data elements or the second plurality of data elements, each having a first size, into a fewer quantity of data elements having a second size larger than the first size.

In some embodiments, combining is based on data within a CHUNKED_SUBATOM subatom.

In some embodiments, the method further comprises: prior to decoding or re-encoding, extracting integrity data from the second plurality of data elements; and in accordance with a determination of successful validation for respective data elements based on respective integrity data, performing at least one of: decoding or re-encoding; and in accordance with a determination of an unsuccessful validation for respective data elements based on respective integrity data, refraining from performing at least one of: decoding or re-encoding.

In some embodiments, the integrity data includes hash data and validation of the hash data is based on a key information. In some embodiments, key information includes at least one of a public key or a private key.

In some embodiments, key information is received from an authentication server.

In some embodiments, the method further comprises: prior to decoding or re-encoding, in accordance with a determination that the second plurality of data elements includes respective encrypted data, decrypting the respective encrypted data using a decryption key.

In some embodiments, the key information or hash data is associated with bitstream_encryption_key_id.

In some embodiments, encryption is applied to the received one or more coded bitstreams associated with a media asset by an owner or creator of the media asset to prevent unauthorized access/consumption/decoding/re-encoding.

In some embodiments, the method further comprises: transmitting identification information associated with the first electronic device to a second electronic device different from the first electronic device; and receiving from the second electronic device, a decryption key enabling access, consumption, decoding, or re-encoding of the one or more coded bitstreams associated with a media asset.

In some embodiments, a method comprises: at a first electronic device: obtaining, with at least one processor, a first coded bitstream of a first type; generating, with the at least one processor, a second coded bitstream of a second type different from the first type; and transmitting, with the at least one processor, the second coded bitstream to one or more second electronic devices via one or more network paths.

In some embodiments, the first bitstream of a first type is generated according to a first type of linear coding protocol or standard.

In some embodiments, the first or the second bitstreams include systematic packets associated with a data segment and non-systematic packets associated with the data segment.

In some embodiments, the first or the second bitstreams include systematic packets associated with the data segment and does not include non-systematic packets associated with the data segment.

In some embodiments, the first or the second bitstreams include non-systematic packets associated with the data segment and does not include systematic packets associated with the data segment.

In some embodiments, the second bitstream of a second type is generated according to a second type of linear coding protocol or standard.

In some embodiments, the one or more network paths include more than one network, more than one network type, more than one network, more than one network transmission medium, or communication channels with different performance characteristics.

In some embodiments, a method comprises: at a first electronic device: receiving a first bitstream associated with a media asset encoded with a first type of coding; in accordance with the determination that the first bitstream should be decoded with a decoder associated with a second type of coding, processing the first bitstream into a second bitstream of a second type of coding, including: extracting data from a set of fields of the first bitstream and mapping the data to a second and corresponding set of fields of the second bitstream; extracting metadata associated with the media asset from the first bitstream; and decoding the second bitstream into to an uncoded representation of the media asset with a decoder associated with the second type of coding; in accordance with the determination that the first bitstream should not be decoded with a decoder associated with a second type of coding, processing the first bitstream, including: decoding the first bitstream into an uncoded representation of the media asset with a decoder associated with the first type of coding and metadata associated with the media asset; and delivering the uncoded representation of the media asset to an application with the extracted metadata associated with the media asset.

In some embodiments, a non-transitory computer-readable storage medium storing instructions which, when executed by a computing apparatus, cause the computing apparatus to perform anu of the preceding methods.

In some embodiments, a computing apparatus comprises: at least one processor; and memory storing instructions, that when executed by the at least one processor, cause the computing apparatus to perform any of the preceding methods.

Other embodiments disclosed herein are directed to a system, apparatus and computer-readable medium. The details of the disclosed embodiments are set forth in the accompanying drawings and the description below. Other features, objects and advantages are apparent from the description, drawings and claims.

Particular embodiments disclosed herein provide one or more of the following advantages. Combining data elements associated with a coding process (e.g., a linear coding process) with data elements including at least one of bitstream identification data, content-specific encode data and media segment data prior to transmitting, enables more efficient delivery of the media data to/from devices with various processing capabilities (e.g., encoding/decoding capabilities) through networks with different performance characteristics. The combined data provides more efficient decoding and reduces the need to generate and transmit multiple redundant types of bitstreams to ensure compatibility, thereby saving networking and processing resources.

The disclosed multisource methods and systems support application-layer coding using a unique bitstream container format (hereinafter, also referred to as "the disclosed bitstream") that supports different applications with a common representation and interface. The disclosed bitstream enables a scalable and interoperable method that supports use of one or more linear codes to enhance the network facing efficiency and reliability of cloud and network connected processing, storage, distribution, delivery and play back of multimedia. The disclosed bitstream is also designed to carry metadata and other information (e.g., coded symbols, block count, number of symbols per block, information about the coding matrix, field size of the coding matrix coefficients) in a compatible format to comply with standardized encoder and decoder implementations of different coding types.

The disclosed methods and systems also support an interchange bitstream format that enables the novel use of several code types and use cases including single-source and multisource media distribution over one or more network and/or access paths.

The disclosed methods and systems also support an embodiment where a single processing entity can seamlessly process and/or decode a plurality of signaled code types on-the-fly.

DESCRIPTION OF DRAWINGS

FIGS. 1A and 1B illustrate the concept of linear encoding and decoding, respectively.

FIG. 18 is a flow diagram of a process of generating a bitstream from non-linear or linear coded data, according to some embodiments.

FIG. 19 is a flow diagram of a process of decoding/re-encoding, according to some embodiments.

FIG. 21 is a flow diagram of another process of converting a new code type for downstream compatibility, according to some embodiments.

Figure 2A:
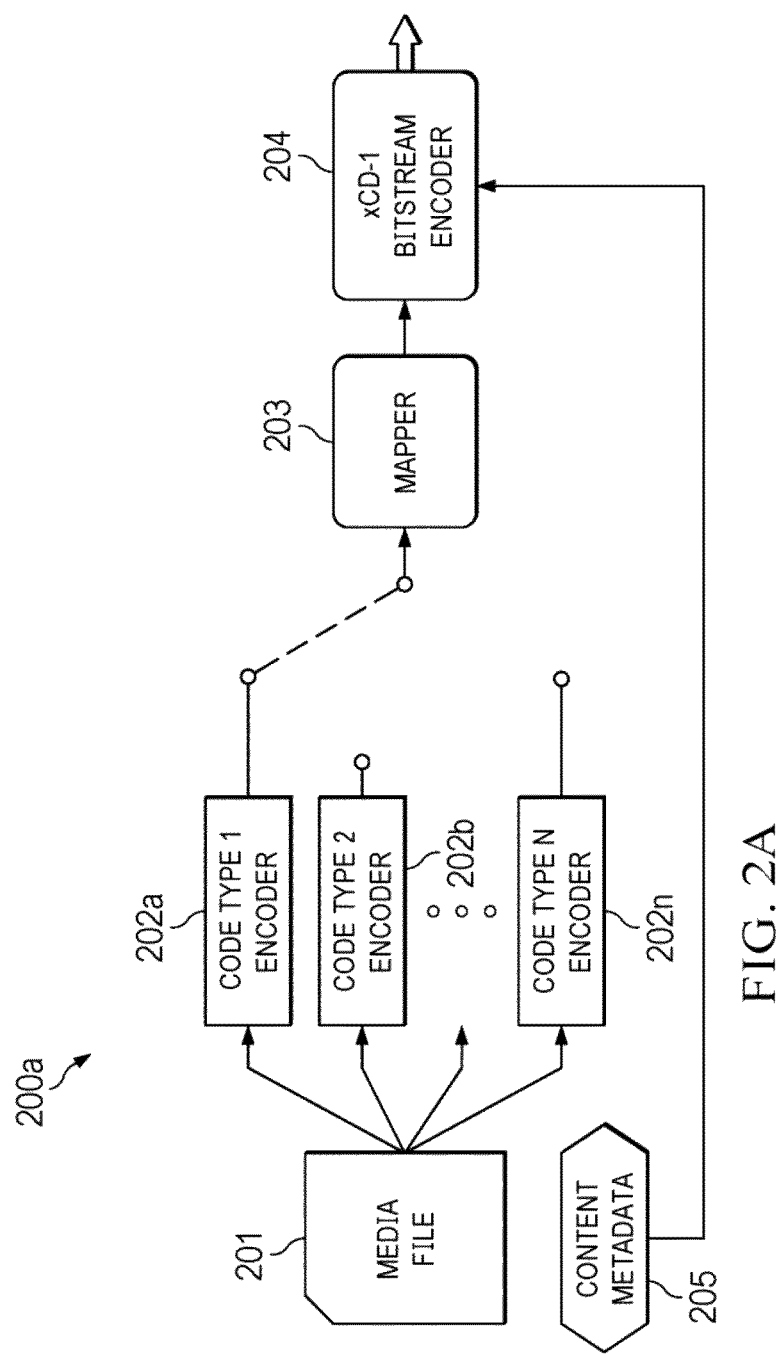
FIGS. 2A and 2B are block diagrams of bitstream encoding and decoding, respectively, according to some embodiments.

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

In addition to the above definitions, the following additional definitions shall apply to the description that follows.

"encoding" refers to encoding source coded/non-linear coded media data input, or re-coding linear coded media input using linear coding.

"finite field" a field with a finite order, where the numbers in the field are arithmetically closed and complete.

"homomorphic hash" is a family of cryptographic hashing algorithms, where the hash of a composite data block (e.g., through linearly combining or concatenating individual data blocks) can be derived using the hashes of the individual data blocks.

"linear codes" are a family of redundancy codes where linear combinations of data segments are created as redundant information. Examples of linear codes include but are not limited to: Reed-Solomon code, RaptorQ code, Random Linear (Network) code, Hamming code, convolutional code, low-density parity check (LDPC) code and Bose-Chaudhuri-Hocquenghem (BCH) code.

"linear encoding" is an operation of generating linear redundancy by linearly combining data segments.

"linear decoding" is an operation of solving linear equations to retrieve original data.

"linear re-encoding" is an operation of generating new linear redundancy by either decoding and then encoding or further linearly combining linear combinations.

"metadata" are high-level descriptive data that helps a receiver process media data, such as media type, frame rate, bitrate, etc.

"post-processing" is processing that converts the delivered data into consumable media by, for example, applying unpackaging and/or decompression.

"pre-processing" is processing raw media data into a suitable format. For example, applying source coding techniques (e.g., compression) to raw media data, and/or packaging the media data using certain representations, such as HTTP-like streaming (HLS) and dynamic adaptive streaming over HTTP (DASH).

Application-Layer Coding Overview

To assist the reader in better understanding the disclosed embodiments, an overview of application-layer coding and, in particular linear coding is discussed below.

A large majority of application-layer codes are linear codes, and encoding data typically follows three basic steps: 1) partition the data into a number of blocks, where the number of blocks may be small (e.g., 1) or large depending on the size of the data; 2) partition each block into a number of source symbols, $X_i$, where i is the index of the original symbol in the block, each source symbol is of a specified size (e.g., in bytes), the final source symbol is padded with zero-valued bytes if necessary, and the number of source symbols is typically chosen based on the application and the coding type used; and 3) encode the source symbols to create an equal or greater number of coded symbols (depending on coding type), $Y_i$.

Mathematical representations of the linear code encoding and linear code decoding steps are shown in FIGS. 1A and 1B, respectively. In the example shown, the original data file or stream is shown partitioned into multiple blocks. Although the example focuses on the linear encoding of one block the linear code encoding/decoding steps are repeated for each block in the data file or stream.

Referring to FIG. 1A, the steps to encode the data given a general linear code are as follows.

Step 1: partition each block of data into a number of source symbols. In this example, 4 source symbols are created from the input block data.

Step 2: formulate a vector of source symbols ($\hat{X}$).

Step 3: generate a coding matrix (G), where each element in the matrix is chosen from a Galois Field GF{q}, where q=2m. In this example, the coding matrix is 6×4.

Step 4: calculate coded symbols (Y) by multiplying the coding matrix (G) with the input source symbols ($\hat{X}$). If a Galois field of GF{2} is used and the coefficient vector for $\hat{y}_1$ is chosen to be $[a_{1,1}, a_{1,2}, a_{1,3}, a_{1,4}]=[1\ 0\ 0\ 0]$, the first coded symbol $y_1$ is equivalent to the first source symbol $x_1$ because the coefficient vector has only one non-zero coefficient. In this case, $y_1$ can be referred to as a systematic symbol.

After encoding, the coded symbols and coding coefficients of the coding matrix are transmitted to the decoder. In other embodiments, the encoded symbols can be cached in the network, CDN, etc., and delivered upon request from one or more client devices that include the appropriate decoder. The coding coefficients of the coding matrix can be: (a) transmitted to the decoder; (b) the means for generating the coding coefficients are parameterized and transmitted to the decoder; or (c) the coefficients are known and assumed in both the encoder and decoder.

With knowledge of the coding coefficients at the decoder, an approach such as, for example, Gaussian elimination can be used to solve for the original symbols from the coded symbols. This process is simplified when systematic symbols are present because systematic symbols are guaranteed to be linearly independent. At a minimum, a number coded symbols equal to or greater than the number of source symbols should be received by the decoder to decode. In some cases, more coded symbols are required if the generated coding coefficients are not linearly independent of each other.

Referring to FIG. 1B, the steps to decode the example linear code above are as follows.

Step 1: determine the coefficient vector associated with each coded symbol and generate the received coding coefficient matrix A.

Step 2: calculate the inverse of A, $A^{-1}$.

Step 3: recover the vector of original symbols ($\hat{X}$) by multiplying the inverse of the received coding coefficient matrix ($A^{-1}$) with the vector of received coded symbols ($\hat{Y}$).

Step 4: concatenate each symbol in $\hat{X}$ to reform the original block data.

Disclosed Bitstream as a Container

Figure 2B:
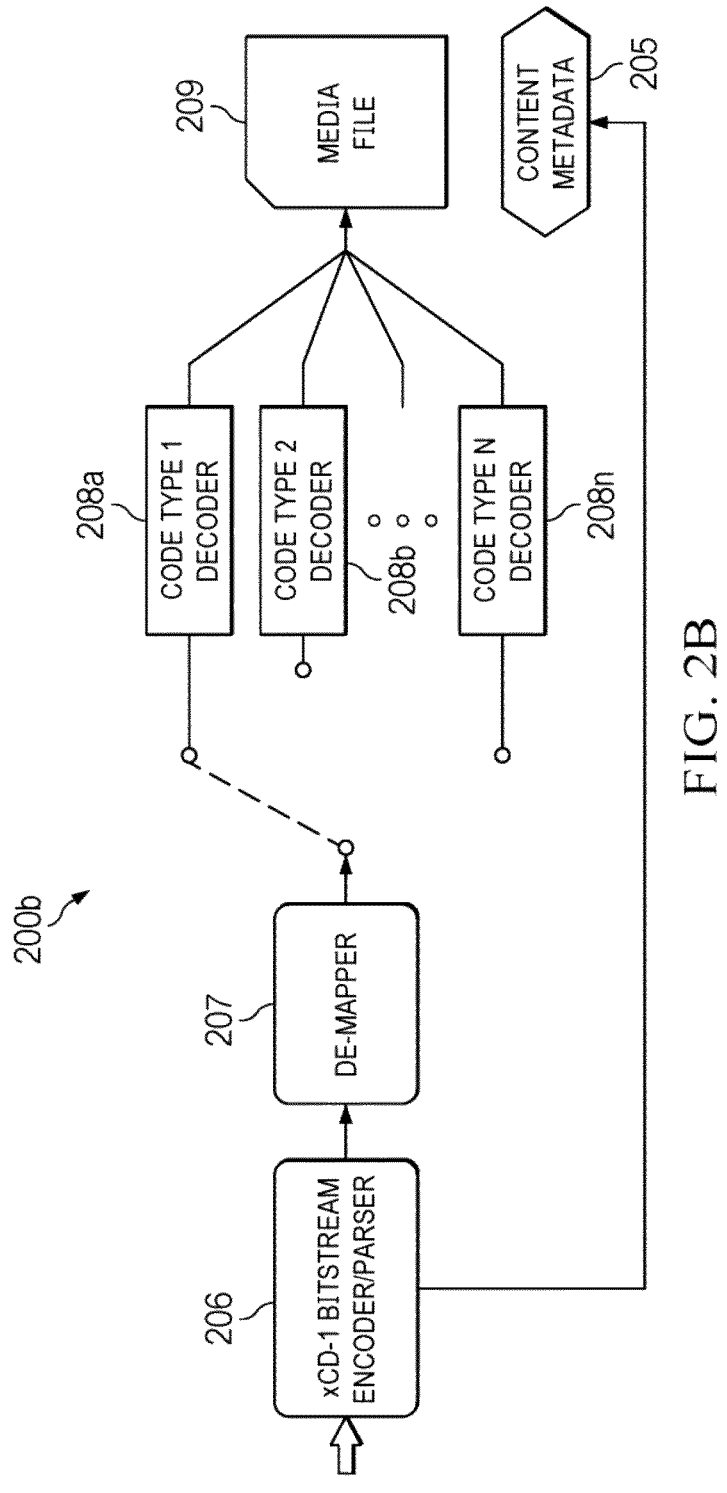

FIGS. 2A and 2B are block diagrams of bitstream encoding and decoding, respectively, according to some embodiments. The disclosed bitstream (see FIGS. 3A, 3B) can be thought of as a container, supporting different application-layer coding types. A particular coding type may be selected for a specific use case. While many coding types have their own formats that produce different kinds of bitstreams, a goal of the disclosed bitstream is to support different applications with a common representation and interface.

Figure 3A:
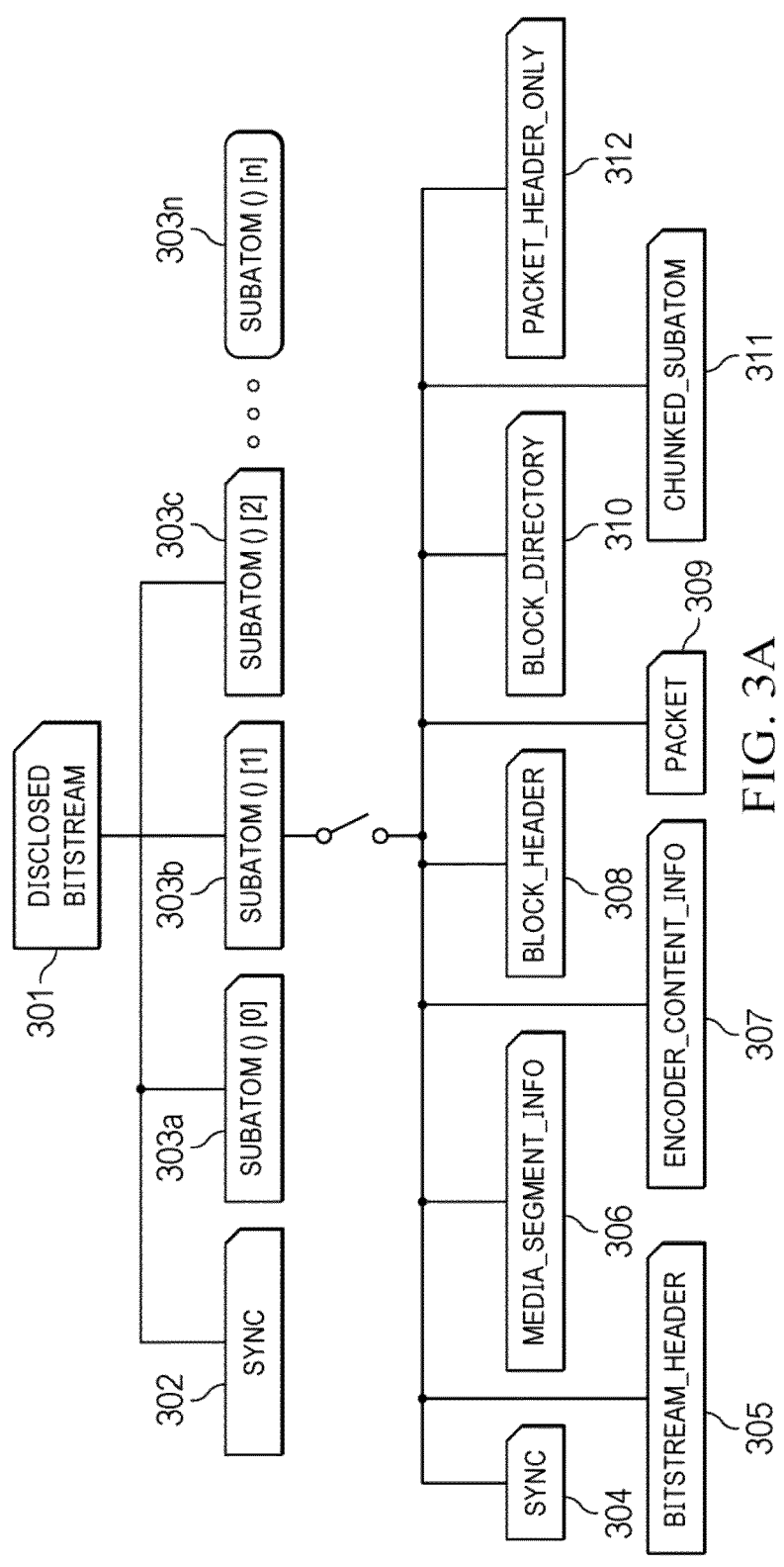
FIG. 3A illustrates a hierarchical organizational structure of data elements of the disclosed bitstream, according to some embodiments.
Figure 3B:
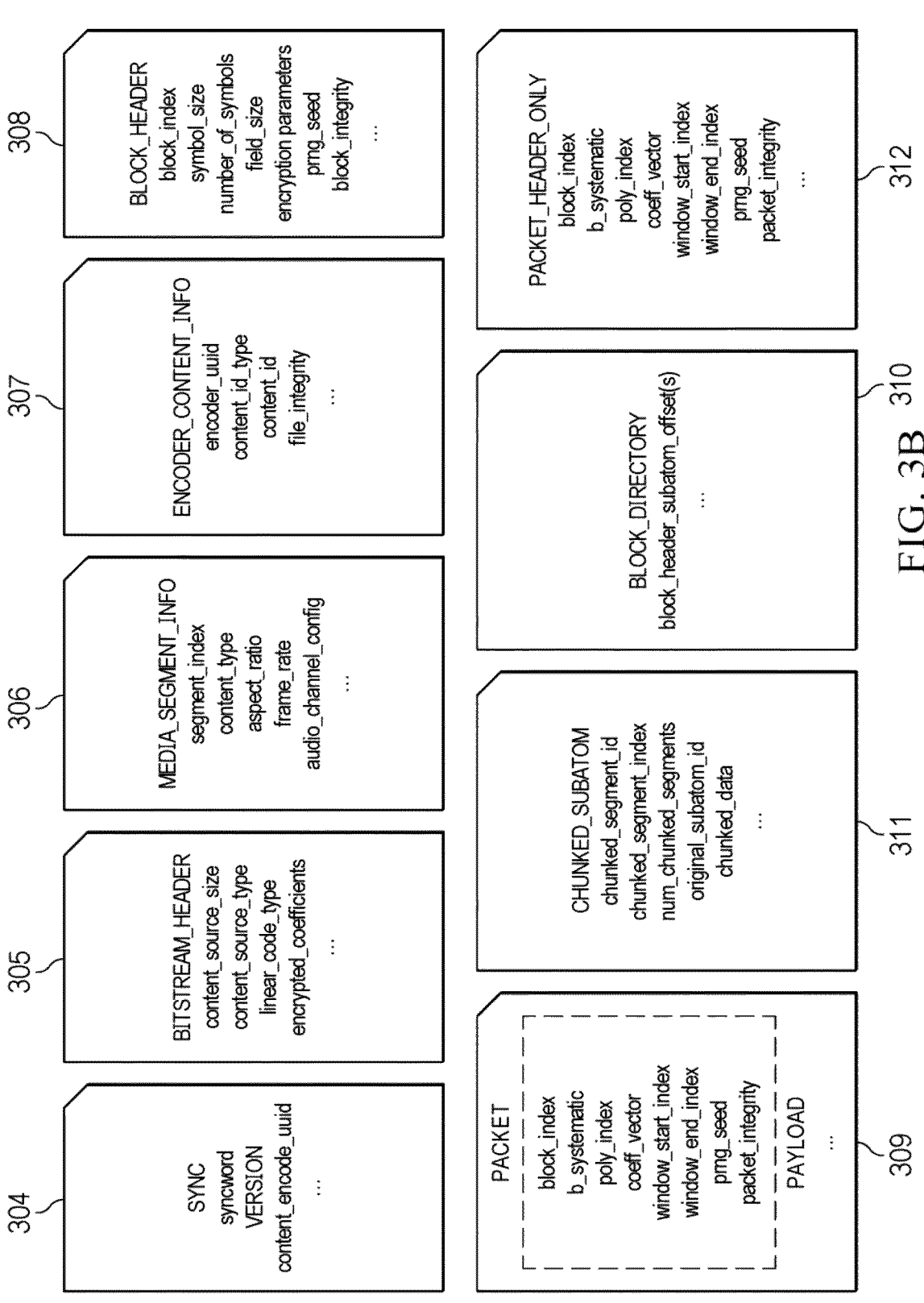
FIG. 3B illustrates example data elements in a subatom of the disclosed bitstream, according to some embodiments.

When application-layer coding is used, information is transmitted to the receiver to recover the original data. For example, in addition to the coded symbols, the block count, the number of symbols per block, information about the coding matrix, and the field size of the coding matrix coefficients are sent to the receiver. The disclosed bitstream shown in FIGS. 3A, 3B is designed to carry metadata and this information in a compatible format to comply with standardized encoder and decoder implementations of different coding types. A bitstream mapper is used to translate the information produced by an application-layer encoder to the data element types supported by the disclosed bitstream.

Referring to FIG. 2A, system 200a includes media file 201, application-layer encoders 202a . . . 202n, bitstream mapper 203 and bitstream encoder 204. Bitstream mapper 203 translates the information produced by bitstream encoders 202a . . . 202n to data element types supported by the disclosed bitstream generated by bitstream encoder 204. Bitstream encoder 204 generates the disclosed bitstream that includes the supported data element types output by bitstream mapper 203 and content metadata 205.

Referring to FIG. 2B, system 200b includes bitstream decoder/parser 206, de-mapper 207 and application-layer encoders 208a . . . 208n. Bitstream decoder/parser 206 uses content metadata 205 to decode the received disclosed bitstream and parse the data elements in the disclosed bitstream. Bitstream demapper 207 translates the data element types back to those required by standardized application-layer decoders 208a . . . 208n. The outputs of application-layer decoders 208 . . . 208n are combined into media file 209 together with content media data 205.

Example Disclosed Bitstream Structure

FIG. 3A illustrates a hierarchical organization 300 of disclosed bitstream 301, according to some embodiments. Disclosed bitstream 301 provides an extensible container that enables several new, more efficient, and reliable, storage, caching, distribution, and delivery paradigms for multimedia applications than currently provided by existing methods. These new multimedia applications are not within reach utilizing today's source coding and highly duplicative storage methods for distributing media over a single and/or a plurality of communication channels/networks. More particularly, disclosed bitstream 301 enables a scalable and interoperable method that supports use of one or more linear codes to enhance the network facing efficiency and reliability of cloud and network connected processing, storage, distribution, delivery and playback of multimedia.

In an example embodiment, a source coded multimedia asset is mapped to one or more functionally equivalent binary representations or "bitstreams" by one or more linear coding processes to generate a plurality of functionally equivalent (FE) bitstreams according to the format of disclosed bitstream 301 shown in FIG. 3A. In some embodiments, each of the FE bitstreams generated by a linear coding process, begins with SYNC subatom data structure 302. The information defined in SYNC data structure 302 is used for subsequent processes to synchronize to, identify and interpret disclosed bitstream 301. In some embodiments, SYNC data structure 302 and the information defined in the SYNC data structure 302 can also be contained within a subatom (a bitstream data structure) and injected at any point within disclosed bitstream 301 for applications that require resynchronization. The information contained within SYNC data structure 302 provides a universal entry point for bitstreams generated for applications described in the disclosed embodiments including but not limited to, forward compatibility with future applications with future linear code types and subatoms.

Following SYNC data structure 302, each disclosed bitstream 301 includes a plurality of subatom data elements 303a . . . 302n (hereinafter, referred to as "subatoms") containing information required for enabling one or more applications. Each subatom 303a . . . 303n includes a subatom_id field (not shown) that enables disclosed bitstream 301 to describe and carry one or more unique subatoms and information required to enable one or more applications. As noted above, the use of the disclosed subatom_id bitfield enables the definition and use of several unique subatom data structures for the format of disclosed bitstream 301.

As shown in FIG. 3A, each subatom 303a, 303b, 303c . . . 303n is a generic container that can be populated with different types of data. Because a subatom can only carry only one type of data, the type of data carried within the subatom defines the subatom type, and the associated data structure. For example, a BITSTREAM_HEADER subatom 305 is an instance of the subatom 303a syntactical structure carrying a bitstream header syntonical structure (BITSTREAM_HEADER).

Hereinafter, the subatoms and their respective bitfields may be referred to more generally as "data elements." Additionally, a subatom type may be referred to by its name (e.g., bitstream subatom) or its associated syntactical structure (BITSTREAM_HEADER( )). In some embodiments, each subatom 303a, 303b, 303c . . . 303n includes the following syntactical structure: SYNC 304, BITSTREAM_HEADER 305, MEDIA_SEGMENT INFO 306, ENCODER CONTENT INFO 307, BLOCK HEADER 308, PACKET 309, BLOCK_DIRECTORY 310, CHUNKED_SUBATOM 311 and PACKET_HEADER_ONLY 312. While a valid disclosed bitstream 301 can contain a single subatom, a decoder receives multiple subatoms containing a BITSTREAM_HEADER, BLOCK_HEADER(S) AND PACKET(S), to successfully decode disclosed bitstream 301. The syntax permits additional subatom data types to be defined in the future for new applications.

FIG. 3B further illustrates the data elements in each subatom of the disclosed bitstream 301 container format, according to some embodiments. Data carried by unique instances of a subatom described below can either be independent or dependent on other subatoms. The correct parsing/interpretation and/or decoding of a subatom may require data from a previous subatom instance to be parsed and/or processed correctly. Subatom data elements are described below.

SYNC subatom 304 is used to identify and synchronize two bitstreams generated from the same source media asset. Some examples of semantics/usage of the SYNC subatom 304 data elements (e.g., bitfields) are described below.

syncword: a unique byte sequence used to identify that a disclosed bitstream complies with the format of disclosed bitstream 301.

version: the specific version of the bitstream syntax that follows. This bitfield enables the bitstream to be extended in a backward and forward compatible manner.

content_encode_uuid: a unique identifier that, in one example, enables a multisource media system (e.g., including encoders, decoders, re-encoders, parsers, processors, etc.) to implicitly signal a specific 'encode' of a media asset. In one example, this information is useful for downstream processes to efficiently (and independently) determine the lineage of the encoded bitstream(s) generated by one or more encoders or re-encoders. An encoded bitstream with this level of implicit signaling of lineage is advantageous in that it enables a multisource media system to operate most efficiently, by ensuring all coded media sources (distributed and available across a plurality of nodes, including storage/caches in a network) include unique and functionally equivalent coded representations of the media.

BITSTREAM_HEADER subatom 305 contains high-level general file information about the linear encoded data, such as the linear encoding method used, bitstream profile information, as well as an indication whether parts of the bitstream are encrypted. Some examples of semantics/usage of the bitstream_header bits fields are below.

content_source_size: indicates the size of the linear encoded media in bytes.

content_source_type: indicates more information about the linear encoded media source that follows, such as whether the encoded stream has been sourced from the original content, an encoded variant or a live stream.

linear_code_type: indicates which type of linear code is used to encode the content.

profile_information: enables processing of bitstreams that conform to a specific profile useful in applications to efficiently determine whether a particular bitstream is suitable for a particular decoder/parser with restricted or limited capabilities.

encrypted_coefficients: enables implicit signaling of coding coefficient encryption is active.

Encryption of coding coefficients can be viewed as a form of digital rights management and thus, reduce or eliminate the need to fully encrypt the linear coded media essence itself.

MEDIA_SEGMENT_INFO subatom 306 is used for media streaming applications where, in network and over-the-top (OTT) media streaming applications/services, content is divided into segments, e.g., audio and video segments. Hereinafter, MEDIA_SEGMENT_INFO is also referred to more generally as "media segment data." The structure of MEDIA_SEGMENET_INFO subatom 306 provides information about the media in the segment, such as its audio/video properties (e.g., frame rate, bitrate, codec type, etc.). This information might typically be found in a manifest file (e.g., DASH manifest or HLS manifest). The information is contained within this structure to avoid having to decode the bitstream to inspect the linear encoded data. Examples bit fields of MEDIA_SEGMENT_INFO subatom 306 are below.

segment_index: identifies the media index of the segment represented in the current subatom.

content_type: indicates the type of multimedia contained in this media segment, such as audio, video, text, or application data.

aspect ratio: the ratio between the width and height of video.

frame_rate: the number of video frames per second.

audio_channel_config: the configuration of audio (e.g., channels, locations, object, virtualized, etc.).

ENCODER_CONTENT_INFO subtom 307 identifies the specific linear encoder used to create the bitstream along with a unique identifier representing the underlying media content. ENCODER_CONTENT_INFO subtom 307 also carries information that enables verification of the integrity (trustworthiness) of the underlying stream/file/block information and information pertaining to the duration of the underlying stream/file/block information when decoded. Some examples of semantics/usage of ENCODER_CONTENT_INFO subtom 307 bitfields are below.

encoder_uuid: a unique identifier that, in one example, enables a multisource media system (e.g., including encoders, decoders, recoders, parsers, processors, etc.) to intrinsically signal the lineage of encoded bitstreams generated by one or more encoders or recoders. An encoded bitstream with intrinsic signaling of lineage is a key function of the disclosed embodiments that enable a multisource media system to operate most efficiently, by ensuring all coded media sources (distributed and available across a plurality of nodes, including storage/caches in a network) are comprised of unique and functionally equivalent coded representations of the media.

content_id_type: indicates the type of identification format used to identify the content, such as Entertainment Identification Registry (EIDR), Advertising Digital Identifier (Ad-iD) or user defined values.

content_id: carries an ID value as per the content_id bitfield.

In some embodiments, the data elements described above enable processing entities throughout a distributed system (including content centric networks) to efficiently identify information about the underlying coded media without having to decode the media, communicate with a centralized server or locate the stream/segment manifest (if applicable). This feature is a one of several key enablers of future media distribution paradigms that will not utilize HTTP delivery.

.file_integrity: a unique data structure that provides a mechanism to verify that the received and decoded stream/block matches that of the original source. The delivery.file_integrity structure maps to fb_integrity( ) bitfields which further specify information including for example, the hashing function used to hash the file/stream/block, the hash size, and the actual hash value. In one example, fb_integrity( ) bitfields enable any processing node in a network to independently validate the authenticity of coded multisource bitstreams. This functionality also enables the use of traditionally untrusted media sources such as mobile devices, personal computers (PCs), set-top boxes, digital media adapters, home gateways to be leveraged for storing multisource coded media.

BLOCK_HEADER 308 contains information about the linear encoding parameters applied to the data within a block of data, such as the block size, symbol size, number of symbols, and finite field size. Some examples of semantics/usage of BLOCK_HEADER data elements are below.

block_index: a multisource coded media segment may be partitioned into blocks, where each block is encoded separately. This field indicates the index of the block.

symbol_size: the size of systematic and linear coded symbols in bytes.

number_of_symbols: signals the number of coded symbols a block is partitioned into for linear coding.

field_size: the size of the finite field the linear coding operates under.

encryption parameters: These fields are used to decrypt encrypted coding coefficients.

prg_seed: a linear code may use a pseudo-random number generator to generate randomized coding decisions for the current block. Prng_seed is the seed used to initialize the pseudo-random number generator in a decoder or recoder.

block_integrity: a structure that provides a mechanism to verify that the received and decoded block matches that of the original source. The structure can contain information such as the hashing function used to hash the block, the hash size, and the actual hash. In one example, an implementation can use SHAI or homomorphic hashing to hash all the systematic symbols in the current block, and then use a hash aggregator such as Merkle tree to aggregate the symbol hash and obtain the block hash.

PACKET subatom 309 contains a fundamental piece of linear encoded data, namely, a coded symbol. It also contains a packet header data structure which provides information about this coded symbol, such as whether or not it is a systematic symbol, the window size, and the coding coefficients. Some example PACKET subatom 309 data elements are:

packet_header: a set of bit fields that help decode the packet, such as: 1) block_index: a segment may be partitioned into blocks, and each block is encoded separately. This fields indicates the index of a block that this packet belongs to; 2) b_systematic: indicates whether this packet carries a systematic symbol or a linear coded symbol; 3) poly_index: this is a versatile field used to index the packet. It can be used to identify the original symbol index for systematic packets. It can also be used to synchronize packet header only subatoms and packet subatoms; 4) coeff_vector: the sequence of finite field scalars used to linearly combine the systematic packets to generate this symbol; 5) window_start_index: the packet could be generated using a consecutive subset (i.e., a window) of the systematic symbols. This field indicates the index of the first systematic symbol of this window; 6) window_start_index: the packet could be generated using a consecutive subset (i.e., a window) of the systematic symbols. This field indicates the index of the last systematic symbol of this window; 7) prng_seed: the pseudo-random number generator seed used to generate the coefficients of this symbol; and 8) packet_integrity: a structure that provides a mechanism to verify that the received packet is generated correctly before using this packet for decoding or re-encoding. The structure can contain information such as the hashing function used to hash the packet, the hash size, and the actual hash.

In some embodiments, a minimal packet_header can be included in PACKET subatom 309 but store and deliver a complete packet_header separately/independently (e.g., out of band, a separate network session, etc.). With only a minimal packet_header, the payload will unlikely be usable for decoding the data. This approach, for example, enables an additional and simple method of digital rights management through controlling the access to full packet_header.

BLOCK_DIRECTORY subatom 310 contains fields that indicate the start of block header subatom instances within disclosed bitstream 301. In some embodiments, block directory subatom 310 includes one or more of the following fields: block_header_subatom_offsets( ), which describes the offset, in bytes, from the end of BLOCK_DIRECTORY subatom 310, to the start of BLOCK_HEADER subatom(s) 308, in the same disclosed bitstream 301.

CHUNKED_SUBATOM 311 provides a mechanism to partition large subatom data into smaller chunks. For example, if the coded symbol size in PACKET subatom 309 is too large for the transmission protocol in use (e.g., UDP packet has a payload of about 1400 bytes), PACKET subatom 309 can be split into smaller chunks that fit the transmission requirements. Each chunk is then carried by one CHUNKED_SUBATOM 311. Some example bit fields are below. chunked_segment_id: identifies a series of chunked_subatom instances as containing different portions of the same subatom data. When subatom data is chunked, all CHUNKED_SUBATOM 311 instances created shall have the same chunk_segment_id field.

chunked_segment_index: identifies the index of the chunk segment of subatom data contained within the chunked_subatom instance. A parser can use this information to reassemble the chunked subatom data to its original order.

num_chunked_segments: describes the number of chunk segments that the subatom data (associated with the given chunk_segment_id) has been split into.

original_subatom_id: specifies the subatom_id of the segment data contained within this chunked_subatom instance.

chunked_data: the chunk segment of data carried by this chunked_subatom instance.

PACKET_HEADER_ONLY subatom 312 is identical to PACKET subatom 309 with the exception that it does not contain the actual coded symbol.

Example Media Processing and Delivery System

Figure 4:
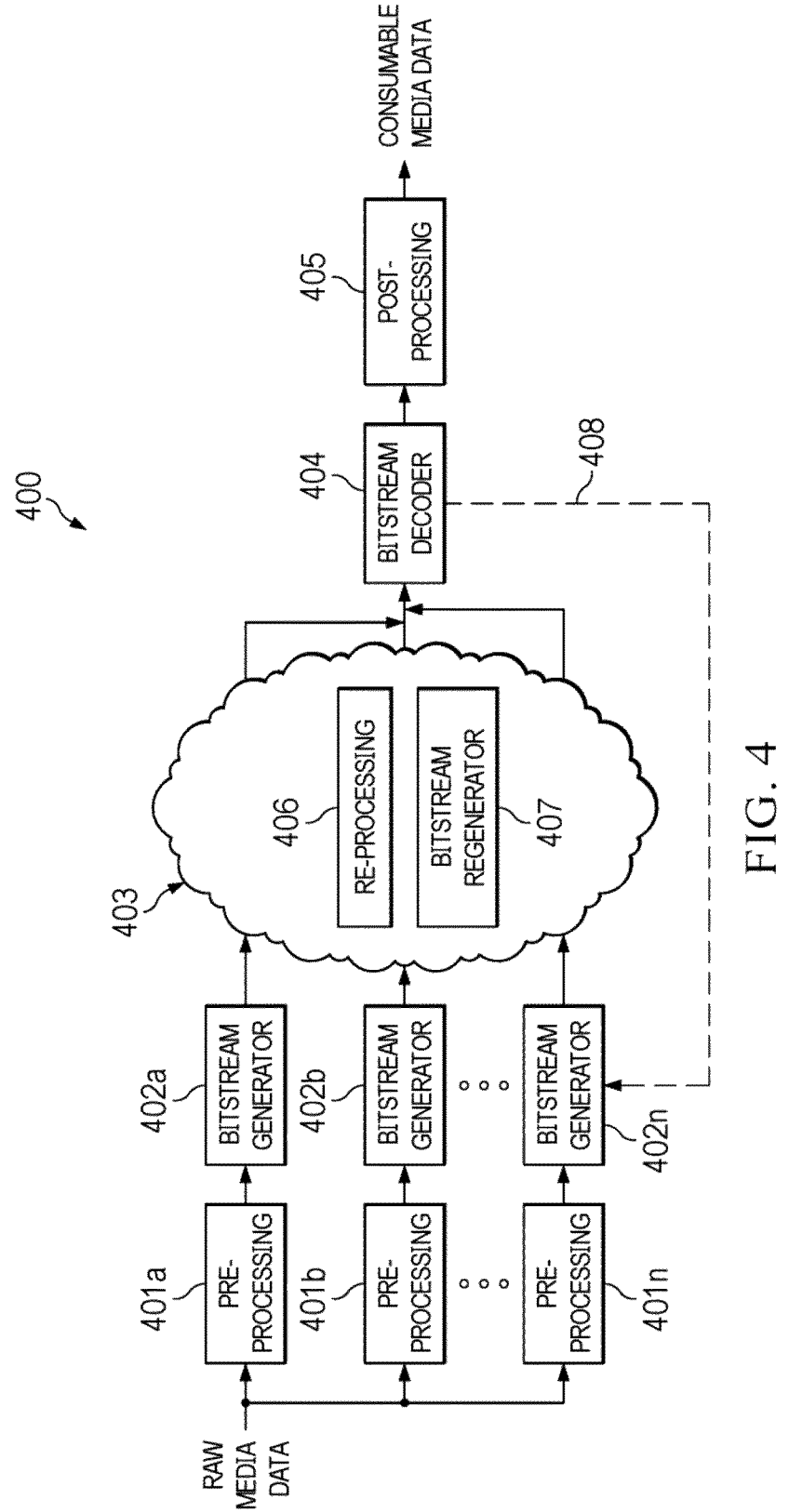
FIG. 4 is a block diagram of a media processing and delivery system, according to some embodiments.

FIG. 4 is a block diagram of a media processing and delivery system 400, according to some embodiments. System 400 includes pre-processing blocks 401a, 401b . . . 401n, bitstream generators 402a, 402b . . . 402n, communication networks 403, bitstream decoder 404 and post-processing block 405. Network/cloud 402 includes re-processing 406 and bitstream regenerator 407. In some embodiments, system 400 can be partially or fully implemented in one or more: servers, such as, e.g., a content delivery network (CDN) server, Point-of-presence (POP) server, application server (e.g., a server hosting an electronic news gathering application, content broadcasting application, unicast application, etc.), content caches, peer devices, local caching devices, edge devices (e.g., 5G/6G edge application server) or client devices (e.g., a media consumption devices, computer, mobile device, gaming system, streaming device, audio/video equipment, etc.).

In this example embodiment, media data is fed to one or more servers. The media data can be obtained from media assets, including but not limited to: images, audio, video, game states, game commands, etc. In some embodiments, the media data is source coded data, data packaged in accordance with a streaming protocol (e.g., HLS, DASH, etc.). In some embodiments, the media data is linear coded data or a coded bitstream associated with the media asset (e.g., a coded bitstream including coded content and associated metadata). In some embodiments, the media data representing a media asset is received from a plurality of network paths.

Pre-processing blocks 401a . . . 401n in the servers pre-process the raw media data. Examples of pre-processing include but are not limited to applying source compression techniques and/or packaging the raw media data as defined by, for example, the HLS and DASH standards. The servers also include respective bitstream generators 402a . . . 402n to generate bitstreams. Different bitstream generators 402a . . . 402n may generate different bitstreams. e.g., with different formats or different payloads. The bitstreams are then transmitted using communication networks 403, which may cache, route, and/or forward the bitstreams. Communication networks 403 may also include entities that can further modify the bitstreams before retransmitting them, such as re-processing 406 and/or regenerating 407 the bitstreams.

A receiver of a bitstream (e.g., a consumer device) downloads one or multiple bitstreams and uses bitstream decoder 404 to recover the processed media data. The processed media data is then post-processed by post-processor 405 and becomes ready for use, e.g., read to be consumed by an end user. Optionally, bitstream decoder 404 sends feedback 408 to bitstream generators 402a . . . 402n, to assist upstream processes in system 400 to adapt to dynamic conditions in communication networks 403.

Example Bitstream Generation

Figure 5:
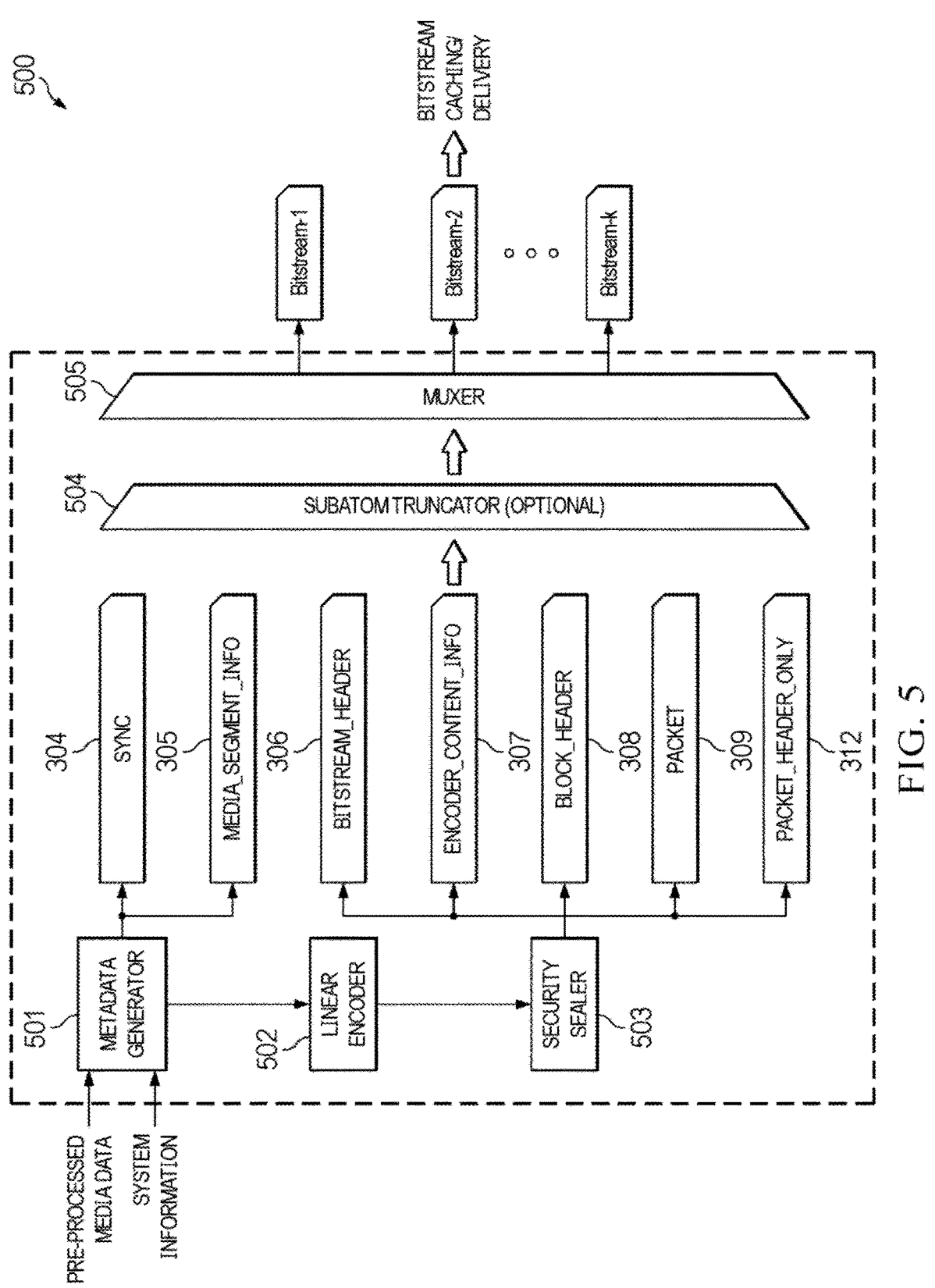
FIG. 5 is block diagram of the bitstream generator shown in FIG. 4, according to some embodiments.

FIG. 5 is block diagram of a bitstream generator 500 (e.g., one of bitstream generators 402a . . . 402n in FIG. 4), according to some embodiments. Pre-processed media data, and, optionally system information that can assist with decision making, are fed to bitstream generator 500. Bitstream generator 500 generates a disclosed bitstream 301 including a plurality of subatoms a described in reference to FIGS. 3A and 3B. In this example embodiment, metadata generator 501 analyzes the pre-processed media data to generate the SYNC subatom 304 and MEDIA_SEG-MENT_INFO subatom 306. Linear encoder 502 performs linear encoding on the media data, e.g., by partitioning the media data into original (source) symbols and then creating linear combinations of the original symbols as linear coded symbols, as described in reference to FIGS. 1A and 1B. The linear encoding information, along with the encoded data, are carried by the data elements BITSTREAM_HEADER, ENCODER_CONTENT_INFO, BLOCK_HEADER AND PACKET subatoms described in reference to FIGS. 3A and 3B, where each packet subatom corresponds to one linear coded symbol.

In some embodiments, security sealer 503 electronically signs the linear coded media data by adding hashing information about the file, data block, and packet to the corresponding ENCODER_CONTENT_INFO, BLOCK_HEADER AND PACKET subatoms. This step enables intrinsic signaling of information necessary for subsequent processing throughout a media system for independent validation/authentication of coded bitstreams/files generated according to the disclosed invention.

In another example embodiment, bitstream generator 500 is also capable of separating the packet header information from the packet subatom and carry the packet header information using a dedicated PACKET_HEADER_ONLY suba-tom 312 to control the access to the corresponding PACKET subatom 309. Coding coefficients in either PACKET suba-tom 309 or PACKET_HEADER_ONLY subatom 312 are encrypted to add a layer of protection to the media content. In some embodiments, each subatom can be further trun-cated by subatom truncator 504 and carried by multiple CHUNKED_SUBATOM subatoms 311 to reduce the suba-tom size. This embodiment is particularly useful when the transport protocol has a limit in data unit size.

The subatoms are then multiplexed by multiplexer 505 ("Muxer") to form one or bitstream(s) 301. Different bit-streams 301 can carry different subatoms and can be pro-cessed (e.g., cached, delivered) differently. To help a receiver navigate the subatoms within each bitstream, mul-tiplexer 505 can generate and insert a BLOCK_DIREC-TORY subatom 310 into each bitstream on the fly.

Example Disclosed Bitstream Decoding

Figure 6:
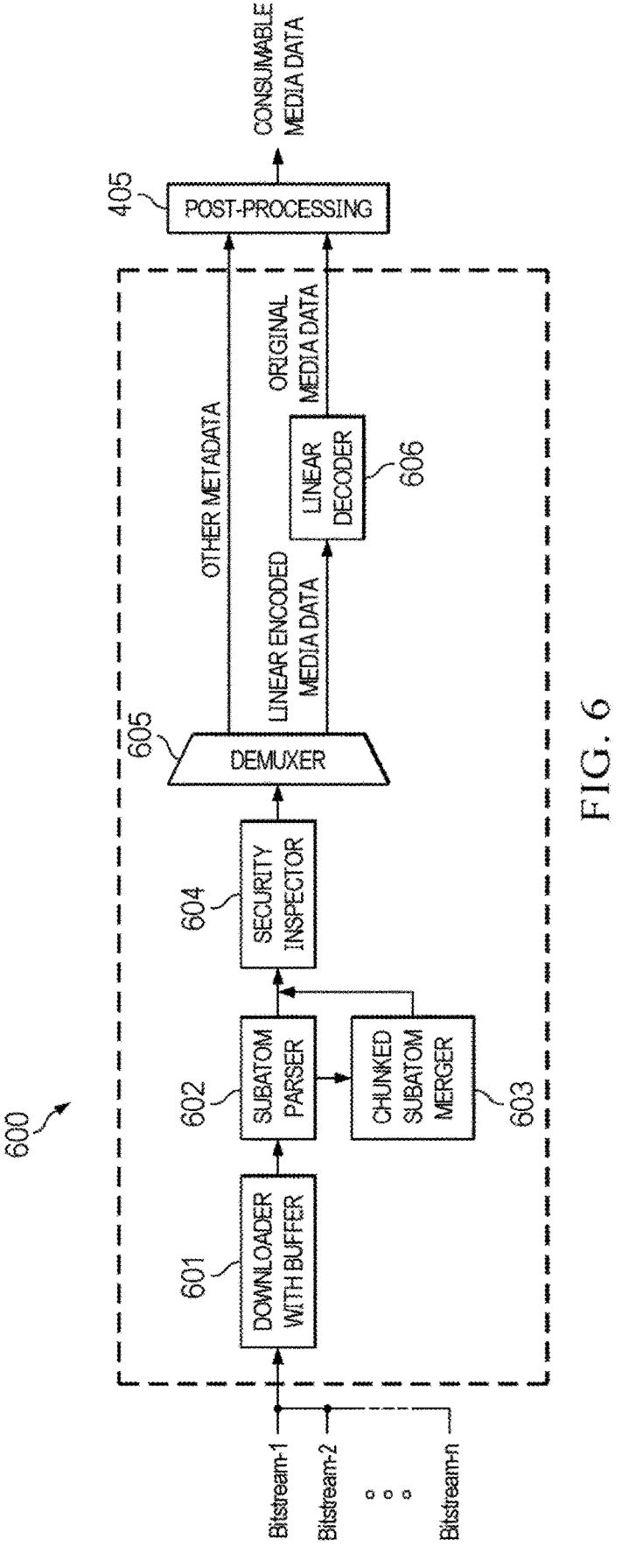
FIG. 6 is block diagram of the bitstream decoder shown in FIG. 4, according to some embodiments.

FIG. 6 is block diagram of a bitstream decoder 600 (e.g., bitstream decoders 404 shown in FIG. 4), according to some embodiments. Bitstream decoder 600 receives data from one or multiple bitstreams having the disclosed bitstream format, where each bitstream includes one or more subatoms. The download of bitstreams is executed by downloader 601, which manages the download (e.g., using buffer(s)), includ-ing but not limited to discovering and selecting media sources, establishing, listening to, and terminating connec-tions, and controlling the speeding an amount of data downloaded from each media source. In some embodiments, subatom parser 602 parses the bitstream to extract and temporarily cache received CHUNKED_SUBATOM suba-toms 311, and chunked subatom merger 603 merges the CHUNKED_SUBATOM subatoms 311. The merged CHUNKED_SUBATOM subatoms 311 are then validated by security inspector 604 when security/authentication/in-tegrity data is present for the media asset.

The validated subatoms are demultiplexed by demulti-plexer 605, where media metadata is extracted and supplied to post-processor 607 (e.g., audio/video decoder), and linear coded data is fed to linear decoder 606 to recover the original media data. The decoded media data is fed to post-processor 607 for post-processing together with the extracted media metadata. so that consumable media data can be obtained at the output of post-processor 607.

Example Disclosed Bitstream Re-encoding

Figure 7:
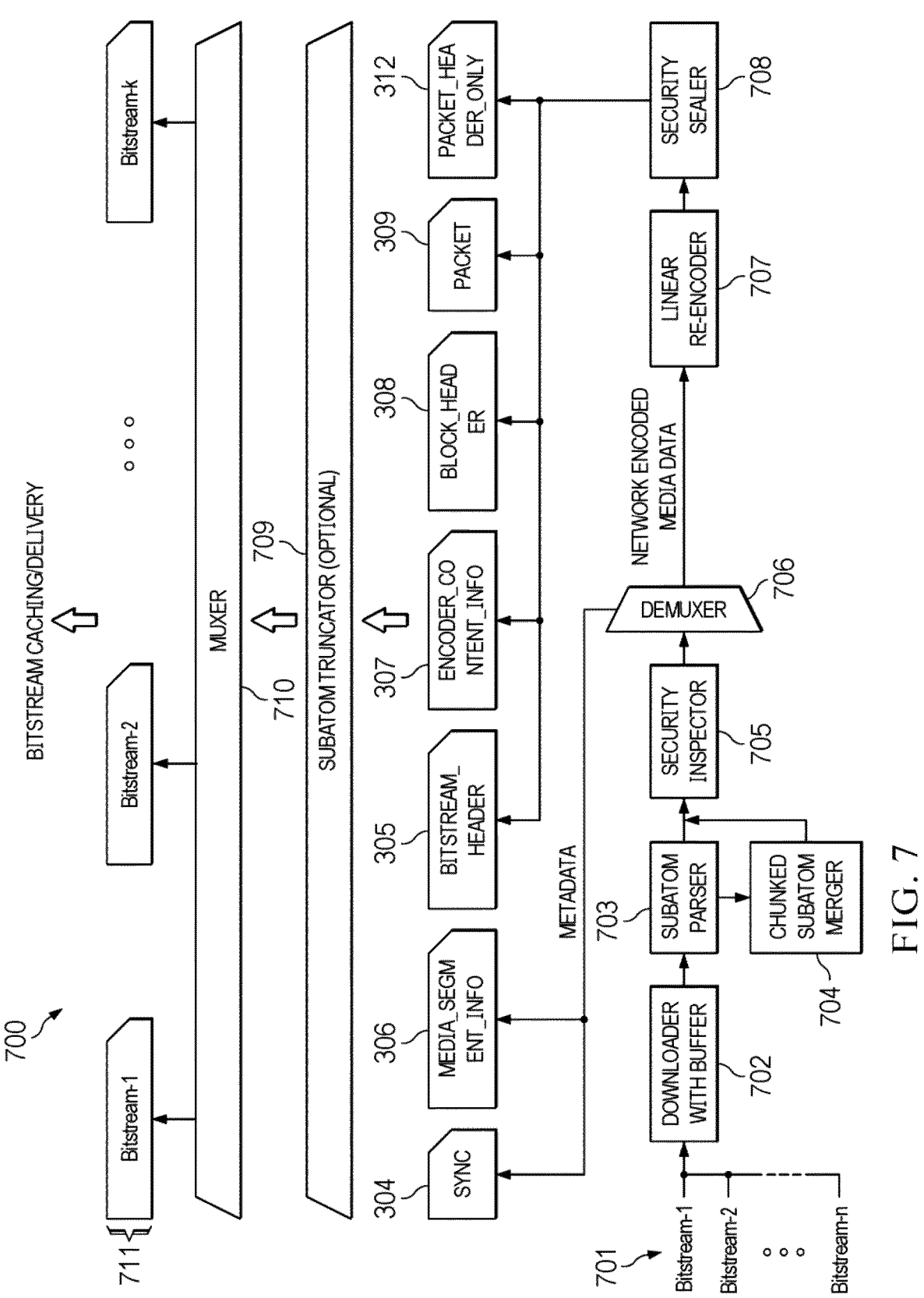
FIG. 7 is a block diagram of a bitstream re-encoder, according to some embodiments.

FIG. 7 is a block diagram of bitstream re-encoder 700, according to some embodiments. Re-encoder 700 down-loads data from one or more disclosed bitstreams 701, each bitstream 701 includes one or more subatoms 304-309, 312. The download is executed by downloader 702, which man-ages the download (e.g., with buffer(s)), including but not limited to discovering and selecting media content sources, establishing, listening to, and terminating connections, and controlling the speed and amount of data downloaded from each media source. Subatom parser 703 parses bitstream 701 to extract and temporarily cache the received CHUNKED_SUBATOM subatoms 311, and chunked suba-tom merger 704 merges the CHUNKED_SUBATOM suba-toms 311. The merged CHUNKED_SUBATOM subatoms 311 are then validated by security inspector 705 when security/authentication/integrity data is present for the media asset.

Validated subatoms are then demultiplexed by demulti-plexer 706, where media metadata is used to recreate SYNC subatom 304 and MEDIA_SEGMENT_INFO subatom 306, while linear coded data is fed to linear re-encoder 707 to create new linear coded data.

The creation of new linear coded data can be implemented in various ways. For example, re-encoder 700 can first apply linear decoding to decode the original symbols and then create new linear combinations of the original symbols as new linear coded symbols. For another example, re-encoder 700 can directly linearly combine the linear coded symbols to create new linear coded symbols.

In some embodiments, the linear encoding information, together with the linear encoded data, are carried by the BITSTERAM_HEADER subatom, ENCODER_CON-TENT_INFO subatom, BLOCK_HEADER subatom, PACKET subatom and PACKET_HEADER_ONLY suba-tom, where each packet subatom corresponds to one new linear coded symbol. Security sealer 708 then electronically signs the media data by adding hashing information about the file, data block, and packet to the corresponding encod-er_content_info, block_header and packet subatoms described above.

In some embodiments, each subatom can be further truncated by subatom truncator 709 and carried by multiple chunked_subatom subatoms to reduce the subatom size. This is particularly useful when the transport protocol has a limit in data unit size. The subatoms are then multiplexed by multiplexer 710 to form and output one or multiple bitstream (s) 711. Different bitstreams can carry different subatoms and can be processed (e.g., cached, delivered) differently. To help a receiver navigate the subatoms within each bitstream, multiplexer 710 creates and inserts a block_directory subatom into each bitstream.

Example Unified Decoders

Figure 8A:
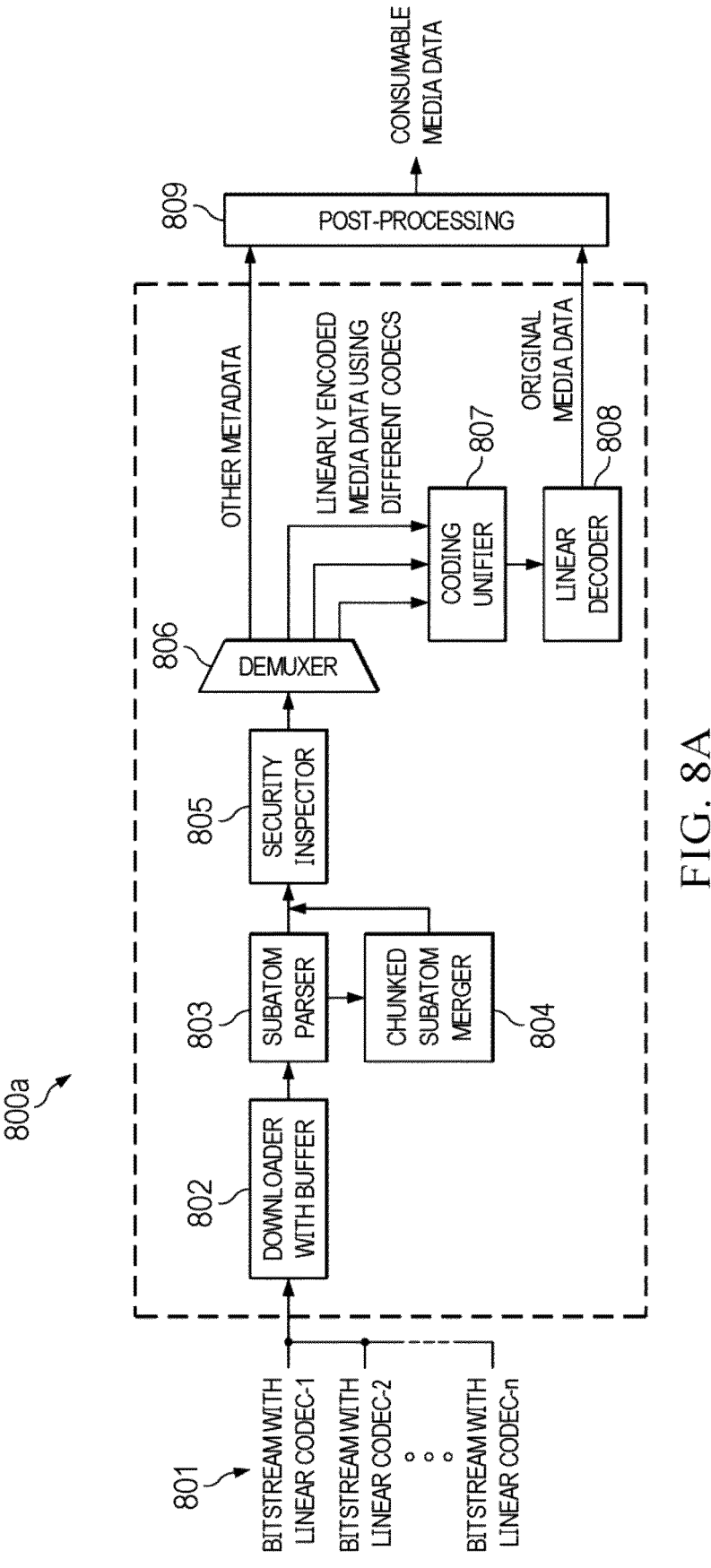
FIG. 8A is a block diagram of a unified decoder, according to some embodiments.

FIG. 8A is a block diagram of a unified decoder 800a, which can recover media data from multiple bitstreams that have implemented different linear coding methods, according to some embodiments. Different bitstreams 801 may use different linear codes that are signaled per a code_type bitfield in BITSTREAM_HEADER subatom 305 of bitstream 801. The download is executed by downloader 802, which manages the download (e.g., with buffer(s)), including but not limited to discovering and selecting media sources, establishing, listening to, and terminating connections, and controlling the speed and amount of data downloaded from each media source. Subatom parser 803 parses bitstream 801 to extract and temporarily cache the received CHUNKED_SUBATOM subatoms 311 which are merged by chunked subatom merger 804. The merged CHUNKED_SUBATOM subatoms 311 are then validated by security inspector 805 when security sealing is enabled for this media asset.

Validated subatoms are demultiplexed by demultiplexer 806, where media metadata is extracted and supplied to post-processor 809 (e.g., audio/video decoder), and linear coded data with different linear codecs is fed to coding unifier 807. Coding unifier 807 unifies the linear coded data from different linear codecs, e.g., by aligning the coefficients and/or projecting the coded data to the same finite field. Unified linear coded data is then fed to linear decoder 808 to recover the original media data. The decoded media data is then fed to post-processor 809 for post-processing using the extracted media metadata, so that consumable media data can be obtained at the output of post-processor 809.

Figure 8B:
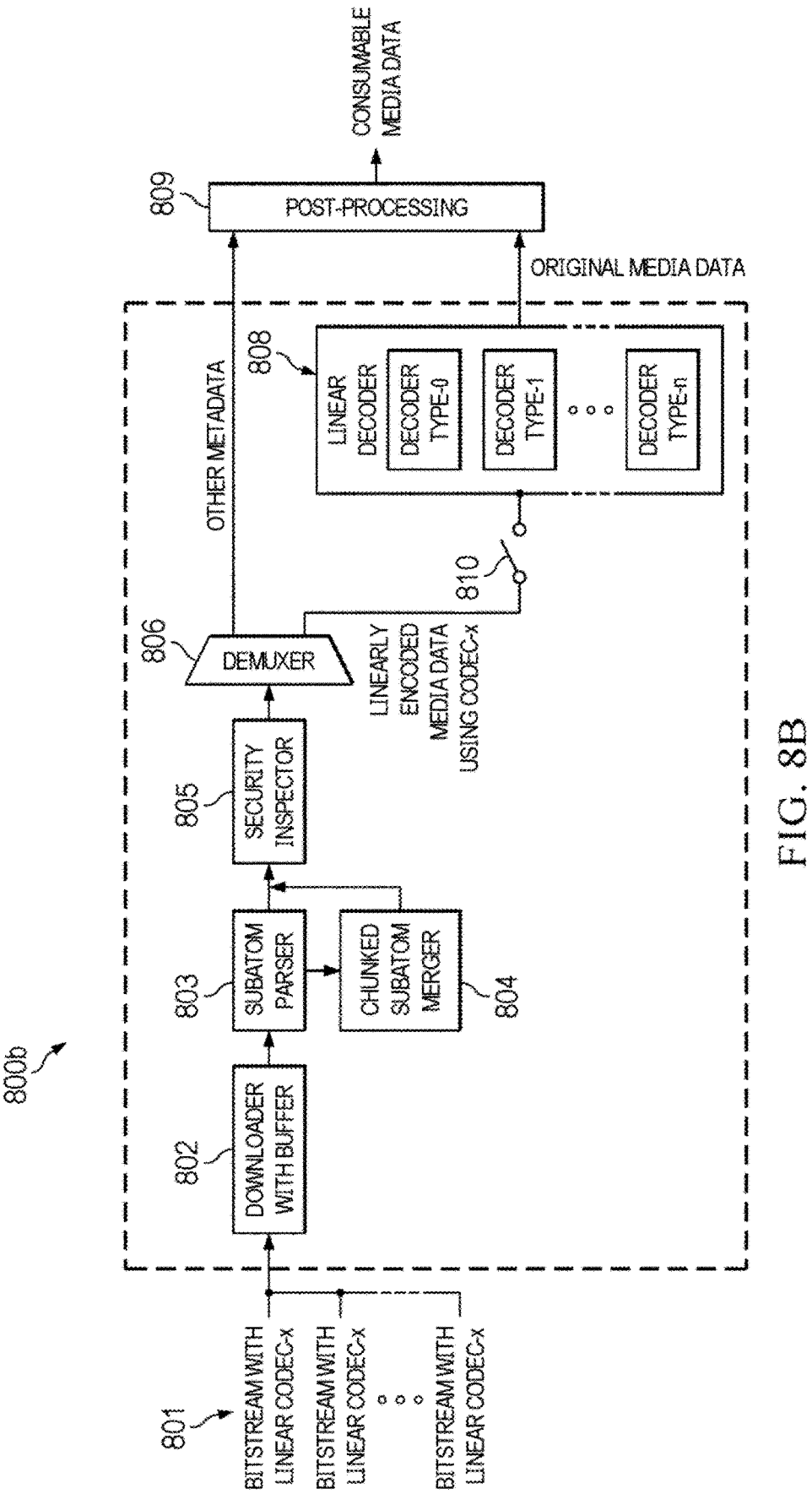
FIG. 8B is a block diagram of a unified decoder with a decoder switch, according to some embodiments.

FIG. 8B is a block diagram of a unified decoder 800b with a decoder switch 810, according to some embodiments. Unified decoder 800b includes linear decoder module 808 that encapsulates multiple different decoder types. Module 808 allows access to a specific type of linear codec via decoder switch 810. More specifically, decoder 800b receives data from one or more bitstreams 801, where each bitstream 801 consists of one or more subatoms 303 (see FIGS. 3A and 3B). Different bitstreams 801 use different linear codecs. The download is executed by downloader 802, which manages the download (e.g., using buffer(s)), including but not limited to discovering and selecting media sources, establishing, listening to, and terminating connections, and controlling the speed and amount of data downloaded from each mead source.

In some embodiments, subatom parser 803 parses bitstream 801 to extract the subatoms and temporarily caches the received CHUNKED_SUBATOM subatoms 311 which are merged by chunked subatom merger 804. The merged CHUNKED_SUBATOM subatoms 311 are then validated by security inspector 805 when security sealing is enabled for this media asset. The complete subatom is then validated by a security inspector 805 when security sealing is enabled for the media asset.

Validated subatoms are then demultiplexed by demultiplexer 806, where media metadata is extracted and supplied to post-processor 809 (e.g., audio/video decoder) and linear coded data, using a specific linear codec, is fed to the unified linear decoder module 808. The unified linear decoder module 808 identifies the type of linear codec used, which is signaled per the code_type bitfield in the bitstream_header( ) of the disclosed bitstream, and dynamically invokes and/or switches decoder switch 810 to the appropriate linear decoder type to decode the original media data. The decoded media data is then fed to post-processor 809 for post-processing with the help of the extracted media metadata, so that consumable media data can be obtained from the output of post-processor 809.

Example Unified Bitstream Re-encoders

Figure 9A:
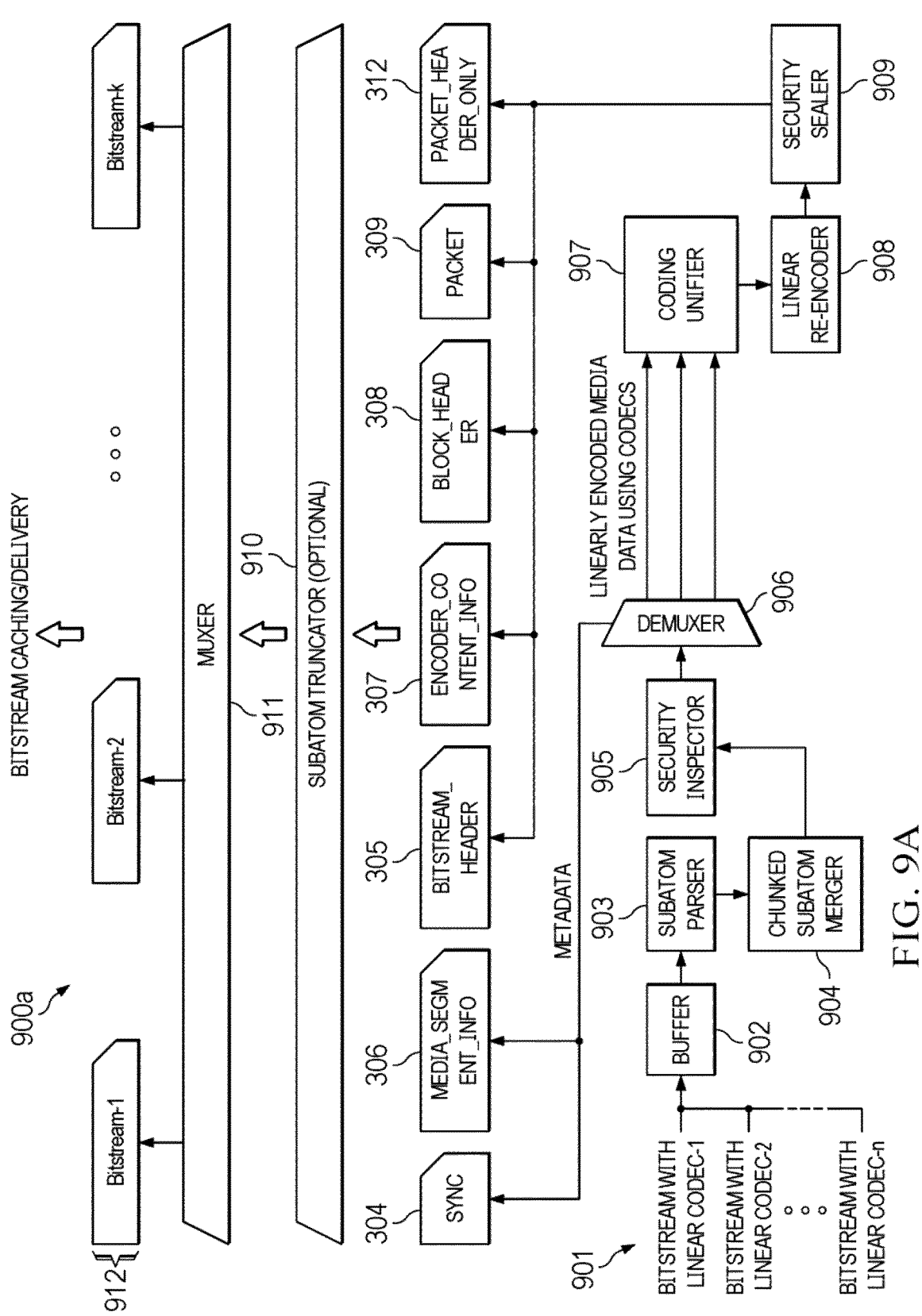
FIG. 9A is block diagram of a unified bitstream re-encoder, according to some embodiments.

FIG. 9A is block diagram of a unified bitstream re-encoder 900a, according to some embodiments. Re-encoder 900a can create new (including linear independent) bitstream(s) from one or more bitstreams that use different linear codecs. More specifically, re-encoder 900a downloads data from one or multiple bitstreams 901, where each bitstream 901 includes one or more subatoms 303 (see FIGS. 3A and 3B). The download is executed by downloader 902, which manages the download (e.g., using buffer(s)), including but not limited to discovering and selecting sources, establishing, listening to, and terminating connections, and controlling the speed and amount of data downloaded from each media source. Subatom parser 903 parses bitstream 901 to extract and temporarily cache the CHUNKED_SUBA-TOM subatoms 311, which are then merged by chunked subatom merger 904. The merged CHUNKED_SUBATOM subatoms 311 are then validated by security inspector 905 when security sealing is enabled for the media asset.

Validated subatoms are then demultiplexed by demultiplexer 906, where media metadata is used to recreate the SYNC subatom 304 and MEDIA_SEGMENT_INFO subatom 306 and linear coded data with different linear codecs is fed to coding unifier 907. Coding unifier 907 unifies the linear coded data with different linear codecs, e.g., by aligning the coefficients and/or projecting the coded data to the same finite field. Unified linear coded data is fed to linear re-encoder 908 to create new linear coded data.

The creation of new linear coded data can be implemented in various ways. For example, re-encoder 900a can first apply linear decoding to decode the original symbols and then create new linear combinations of the original symbols as new linear coded symbols. For another example, re-encoder 900a can directly linearly combine the linear coded symbols to create new linear coded symbols.

In some embodiments, the linear encoding information, together with the linear encoded data, are carried in the BITSTREAM_HEADER subatom 306, ENCODER_CON-TENT_INFO subatom 307, BLOCK_HEADER subatom 308, PACKET subatom 309 AND PACKET_HEAD-ER_ONLY subatom 310, where each PACKET subatom 309 corresponds to one linear coded symbol. Security sealer 909 then seals the security of the media data by adding hashing information about the file, data block, and packet to the corresponding ENCODER_CONTENT_INFO subatom 307, BLOCK_HEADER subatom 308 and PACKET subatom 309.

In some embodiments, each subatom can be truncated by subatom truncator 910 and carried by multiple CHUNKED_SUBATOM subatoms 311 to reduce the subatom size. This is particularly useful when the transport protocol has a limit in data unit size. The subatoms are then multiplexed by multiplexer 911 to form the output of one or more bitstream(s) 912. Different bitstreams 912 can carry different subatoms and can be processed (e.g., cached, delivered) differently. To help a receiver navigate the subatoms within each bitstream 901, multiplexer 911 can create and insert a BLOCK_DIRECTORY subatom 310 to each bitstream 901.

Figure 9B:
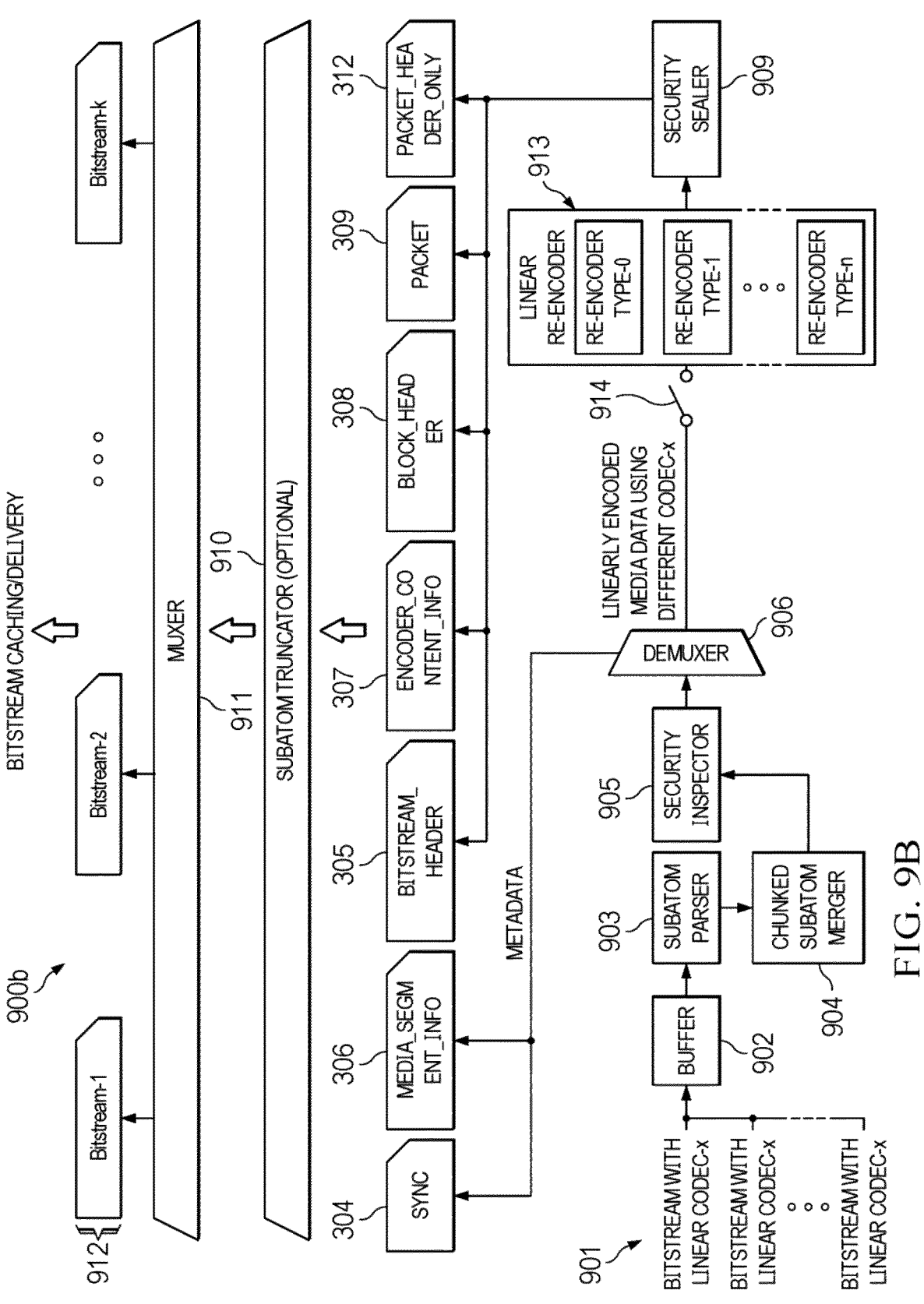
FIG. 9B is a block diagram of a unified bitstream re-encoder with a re-encoder switch, according to some embodiments.

FIG. 9B is a block diagram of a unified bitstream re-encoder 900b with a re-encoder switch 914, according to some embodiments. Unified bitstream re-encoder 900b demonstrates another example implementation of the disclosed unified bitstream re-encoder 900a shown in FIG. 9A, which implements the re-encoder of multiple types of linear codecs and encapsules it inside a linear re-encoder module 913. Linear re-encoder module 913 allows access to a specific type of linear codec via switch 914.

More specifically. re-encoder 900b downloads data from one or multiple bitstreams 901, each bitstream 901 includes one or more subatoms 303 (see FIGS. 3A and 3B). The download is executed by downloader 902, which manages the download (e.g., using buffer(s)), including but not limited to discovering and selecting sources, establishing, listening to, and terminating connections, and controlling the speed and amount of data downloaded from each media source.

In some embodiments, subatom parser 903 parses bitstream 901 to extract and temporarily cache CHUNKED_SUBATOM subatoms 311 from bitstream 901, which are then merged by chunked subatom merger 904. The merged CHUNKED_SUBATOM subatoms 311 are then validated by security inspector 905 when security sealing is enabled for the media asset.

Validated subatoms are then demultiplexed by demultiplexer 906, where media metadata is used to recreate the SYNC subatom 304 and MEDIA_SEGMENT_INFO subatoms 306, and linear coder module 913 data with different linear codecs is fed into linear re-encoder module 913. Linear re-encoder module 913 invokes re-encoder switch 914 to select a particular re-encoder type based on, for example, a switch signal in the bitstream metadata.

The creation of new linear coded data can be implemented in various ways. For example, re-encoder 900b can first apply linear decoding to decode the original symbols and then create new linear combinations of the original symbols as new linear coded symbols. For another example, re-encoder 900b can directly linearly combine the linear coded symbols to create new linear coded symbols.

In some embodiments, the linear encoding information, together with the linear encoded data, are carried in the BITSTREAM_HEADER subatom 306, ENCODER_CONTENT_INFO subatom 307, BLOCK_HEADER subatom 308, PACKET subatom 309, and PACKET_HEADER_ONLY subatom 312, where each PACKET subatom 309 corresponds to one linear coded symbol. Security sealer 909 then seals the security of the media data by adding hashing information about the file, data block, and packet to the corresponding ENCODER_CONTENT_INFO subatom 307, BLOCK_HEADER 308 and PACKET subatom 309.

In some embodiments, each subatom can be truncated by subatom truncator 910 and carried by multiple CHUNKED_SUBATOM subatoms to reduce the subatom size. This is particularly useful when the transport protocol has a limit in data unit size. The subatoms are then multiplexed by multiplexer 911 to form an output of one or more bitstream(s) 912. Different bitstreams 912 can carry different subatoms and can be processed (e.g., cached, delivered) differently. To help a receiver navigate the subatoms within each bitstream 901, multiplexer 911 can create and insert a block_directory subatom to each bitstream 901.

Example Bitstream Mapping for Standards Compliance

Figure 10:
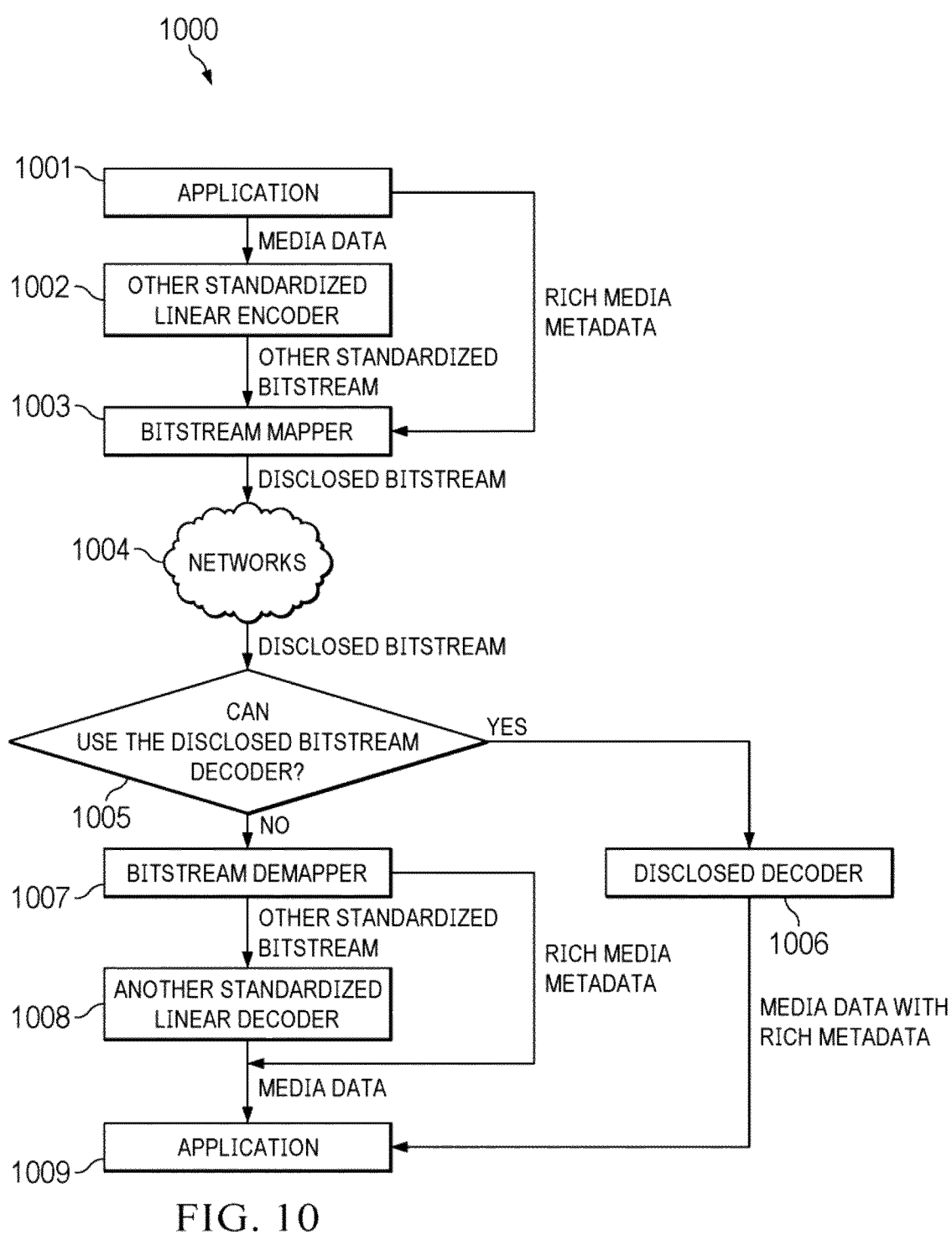
FIG. 10 illustrates bitstream mapping for compliance with other coding bitstream standards, according to some embodiments.

FIG. 10 illustrates bitstream mapping process 1000 for compliance with other coding bitstream standards, according to some embodiments. Disclosed bitstream 301 and its implementation can also serve as a container format to carry linear encoded data generated using various linear coding techniques, even if they have been previously specified or standardized. Process 1000 supports existing linear codes by using bitstream mapper 1003 and bitstream demapper 1007. The disclosed mapping process 1000 enables the disclosed bitstream to remain compliant with existing linear coding methods that have been standardized and implemented in existing media products.

Referring to FIG. 10, the media data to be protected is first encoded using existing standardized linear encoder 1002 of the considered linear coding technique. The output is a standardized bitstream for this technique/method. Bitstream mapper 1003 then extracts fields of this bitstream and maps them to disclosed bitstream 301 having the format described in reference to FIGS. 3A, 3B. Bitstream mapper 1003 also extracts rich media metadata from application layer 1001 to fill the metadata related fields in disclosed bitstream 301. The bitstream is then ready for delivery over communication networks 1004.

At the receiver side, and depending on whether an existing standardized decoder is used. there are two options. First, if an existing standardized decoder is used 1005, then bitstream demapper 1007 maps the coding related data back to the existing standardized bitstream which input into standardized linear decoder 1008, which outputs the media data to application layer 1009. Meanwhile, bitstream demapper 1007 also extracts the rich media metadata from the disclosed bitstream 301 and passes it to application layer 1009 of the receiver. If an existing standardized decoder does not have to be used 1005, or it does not exist, then the receiver uses bitstream decoder 1006 to decode the media data and metadata for application layer 1009 of the receiver.

Figure 11:
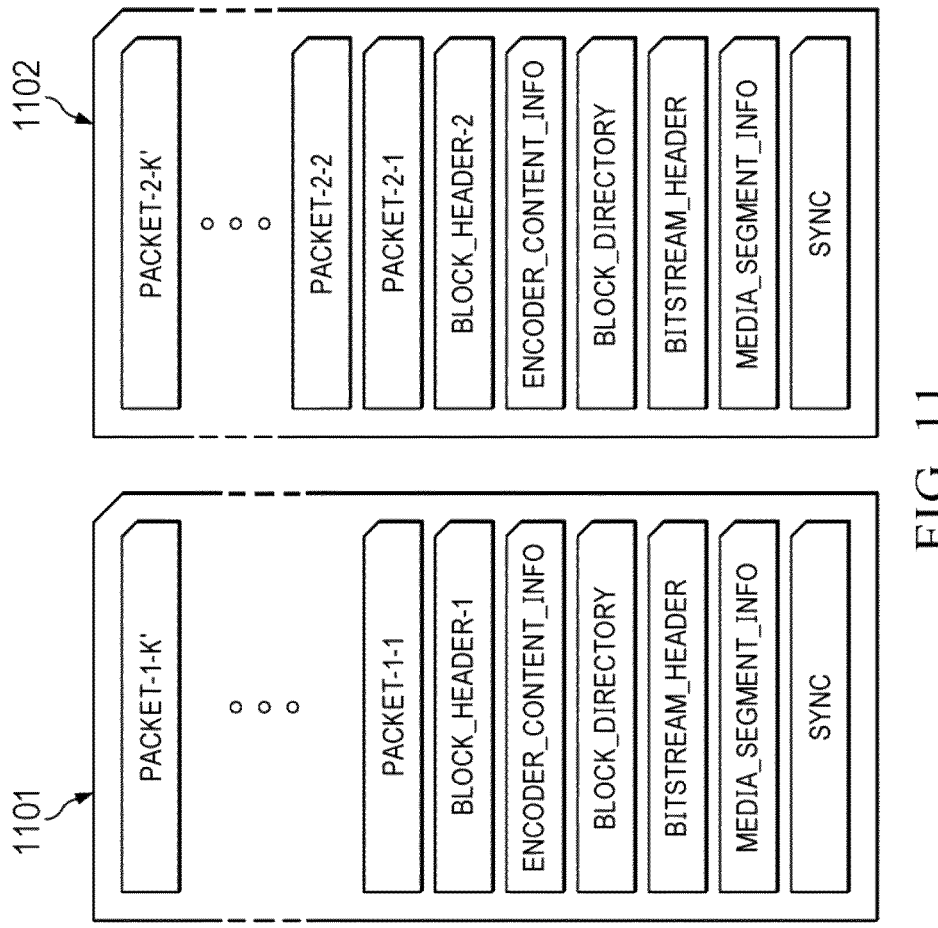
FIG. 11 is a bitstream example of multisource delivery, according to some embodiments.

FIG. 11 illustrates an example implementation of two FE coded copies of a media file, generated using the disclosed bitstream and the bit generator, according to some embodiments. Each coded copy comprises instances of the subatoms disclosed earlier, including all or a subset of SYNC subatom 304, BITSTREAM_HEADER subatom 305, MEDIA_SEGMENT_INFO subatom 306. ENCODER_CONTENT_INFO subatom 307, BLOCK_HEADER subatom 308, PACKET subatom 309, BLOCK_DIRECTORY subatom 310 and PACKET_HEADER_ONLY 312 subatom.

In particular, the BLOCK_HEADER subatom 310 and PACKET subatoms 309 inside different copies are generated in a manner that provides maximum linear independency between the PACKET subatoms 309 across all media sources used. This is achieved by uniquely configuring the disclosed bitstream generator for different media sources. Example configurations that can yield linear independency include applying, at different bitstream generators, different random seeds or the use of different coding coefficient vectors. This way, any coded media PACKET subatoms 309 from any generated copy will be useful for recovery with high probability and, thus, are FE copies (hereinafter, also referred to as "FE copy or copies"). If a FE copy carries enough linearly independent PACKET subatoms 309 that allow media stream/file recovery, then this copy is a called a full FE coded copy. Otherwise, it is called a partial FE coded copy.

Figure 12:
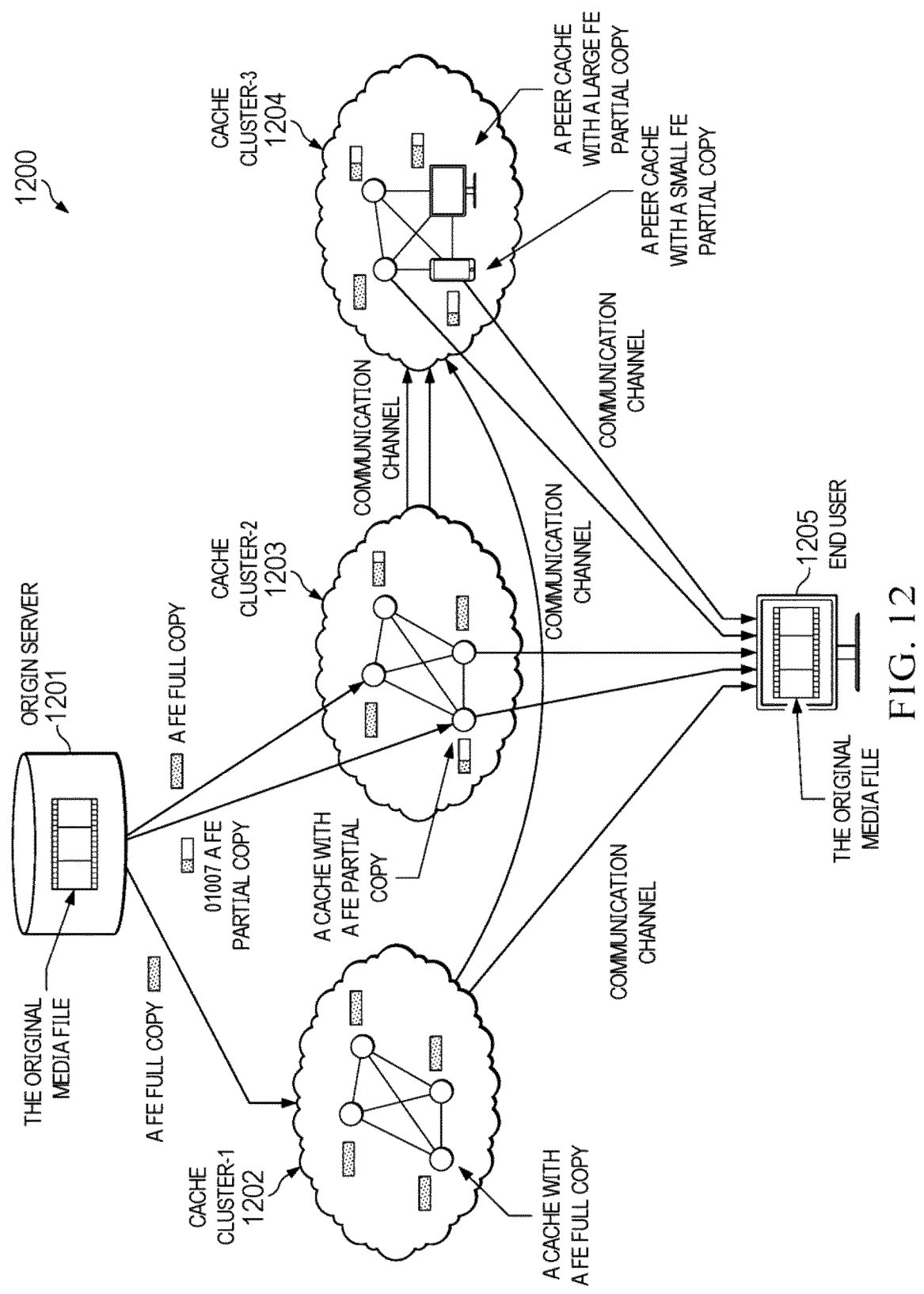
FIG. 12 illustrates a multisource, multi-path delivery system, according to some embodiments.

FIG. 12 illustrates a decentralized multisource, multi-path delivery system 1200 that is enabled by the disclosed bitstream format, according to some embodiments. System 1200 includes: 1) origin server 1201, which possess a source-coded original media file; 2) several clusters 1202, 1203, 1204 of caches, where each cluster contains connected caches that can store, process (e.g., such as re-encoding and decoding) and serve data files. Some examples of clusters include but are not limited to: a CDN, a set of edge computing nodes, a ISP nodes with caching capability, a set of peer users, a hybrid of different types of caches; and end user 1205 who wants to acquire and consume the original media file.

In existing configurations of system 1200, origin server 1201 distributes the original media file to all the connected caches 1202, 1203, 1204 for duplication. By contrast, in the disclosed system that uses disclosed bitstream 301, origin server 1201 uses the disclosed bitstream generator (See FIG. 4) to create different FE coded copies of the original media file, and then distributes each to a different connected cache 1202, 1203, 1204.

In existing configurations of system 1200, caches not connected to the origin server 1201 will connect to one of its neighbors to create a duplication of the original media file. In contrast, in the disclosed system that uses disclosed bitstream 301, such cache connects to multiple neighbors and efficiently use the neighbors' FE copies to create its own FE coded copy using the disclosed bitstream re-encoder described in reference to FIG. 9. The newly created FE copies can also be full or partial copies. The caches 1202, 1203, 1204 could even be end user 1205 who would like to contribute as a peer.

System 1200 is a decentralized media delivery system where all the cache stores different yet FE coded copies of the same original media file. This enables an efficient multi-source multi-path download: the end user 1205 can download from multiple caches 1202, 1203, 1204 in parallel via different communication links, and as long as the total amount of downloaded data is slightly higher than the original media file (due to header overhead, etc.), the end user 1205 can terminate all the downloads and recover the original media file using the disclosed bitstream decoder 404 shown in FIG. 4. This way, end user 1205 can enjoy the aggregated bandwidth and stability of all the communication links without increasing download cost.

The download process described above is superior to existing single-source, single-path download processes, where end user 1205 only connects to one of caches 1202, 1203, 1204 to download the original media file. The performance of the existing download process is limited by the single link between the cache and the end user 1205, and is vulnerable to cache or link failures. It is noted that the disclosed download process is also superior to existing duplication-based, multi-source multi-path download processes, at least because the existing duplication-based, multi-source multi-path download processes require time-consuming and error-prone scheduling between the downloads to avoid downloading duplicated data from the media sources.

Figure 13:
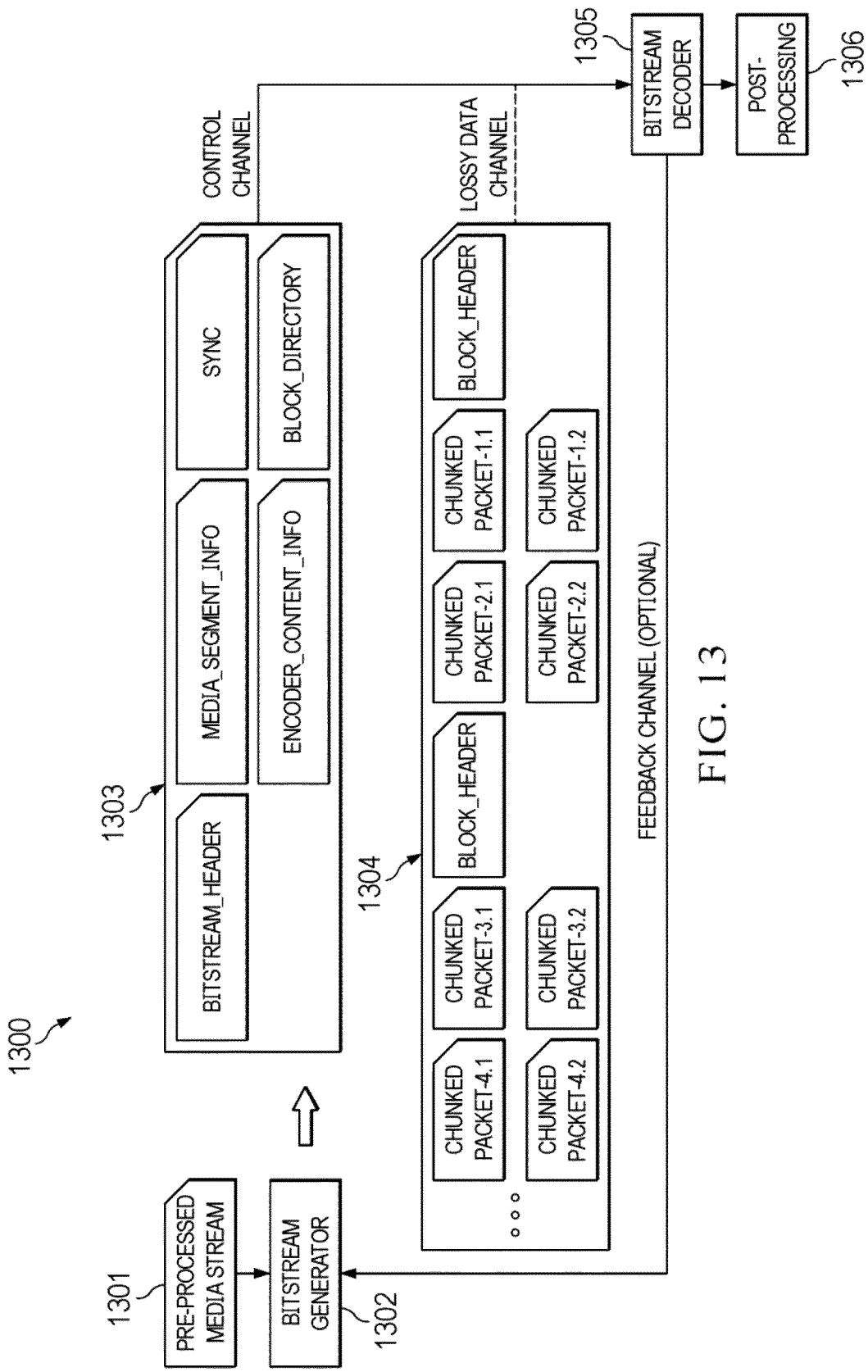
FIG. 13 illustrates a low-latency unicast bitstream delivery system, according to some embodiments.

FIG. 13 illustrates low-latency unicast bitstream delivery system 1300, according to some embodiments. System 1300 demonstrates an example usage of the disclosed bitstream 301 in a low-latency unicast use application, where the receiver demands low-latency and reliable delivery of a data stream via a lossy communication channel. For this use case, the media stream is pre-processed by pre-processor unit 1301 into small chunks that can be sent to a receiver in a short amount of time, such as video frames. Bitstream generator 1302 is applied to the pre-processed bitstream to create the disclosed bitstream 301. Then subatoms 1303 that carry metadata and that do not change frequently, such as SYNC subatom 304, BITSTREAM_HEADER subatom 305, MEDIA_SEGMENT_INFO subatom 306, are delivered to the receiver via a reliable control channel that may have higher latency and lower bandwidth than other channels.

On the other hand, linear coding related subatoms 1304, such as BLOCK_HEADER subatom 308 and CHUNKED_PACKET_SUBATOM subatom 311 are sent to the receive via a low-latency lossy data channel to enable low-latency decoding of the data chunks for post-processing. Optionally, bitstream decoder 1305 can observe the channel conditions and send feedback to bitstream generator 1302 via a feedback channel to help bitstream generator 1302 make informed coding decisions.

Figure 14A:
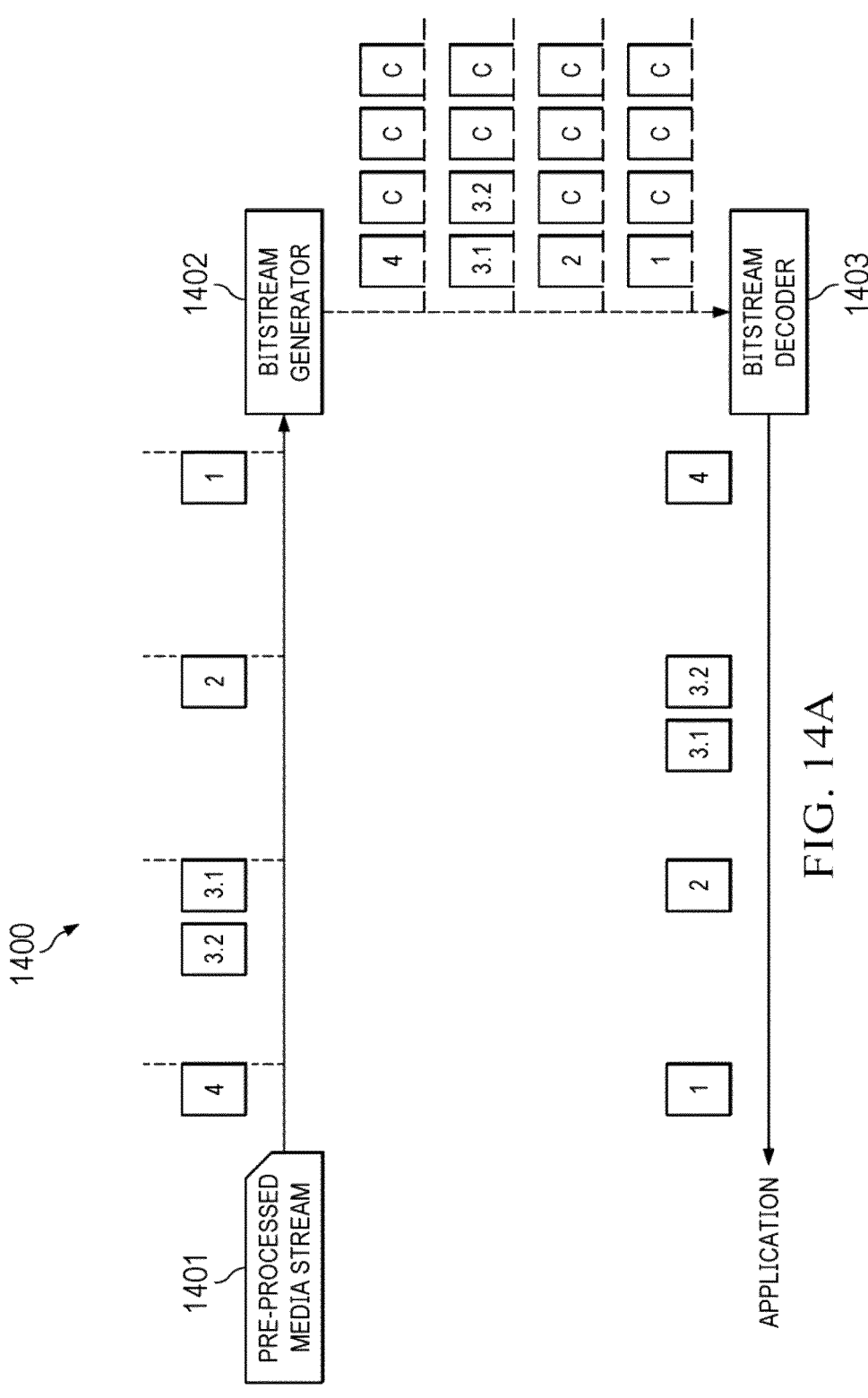
FIG. 14A is a block diagram of a system for low-latency unicast encoding and decoding, according to some embodiments.

FIG. 14A is a block diagram of system 1400 for low-latency unicast encoding and decoding with a focus on the PACKET subatom 309, in accordance with some embodiments. Pre-processed media stream 1401 is fed to bitstream generator 1402 in time ticks, and each tick includes of one or more equal-length data symbols to be linear encoded. In the example shown, ticks 1, 2 and 4 each include 1 data symbol, while tick 3 includes 2 data symbols (3.2, 3.1). Bitstream generator 1402 creates one PACKET subatom 309 for each data symbol as the systematic PACKET subatoms 309, and also creates linear coded packets by applying linear coding to these data symbols. Bitstream decoder 1403 at the receiver side uses the received systematic PACKET subatoms 309 and coded packets together with other supporting subatoms to decode the tick data and pass the data to the application layer of the receiver.

Figure 14B:
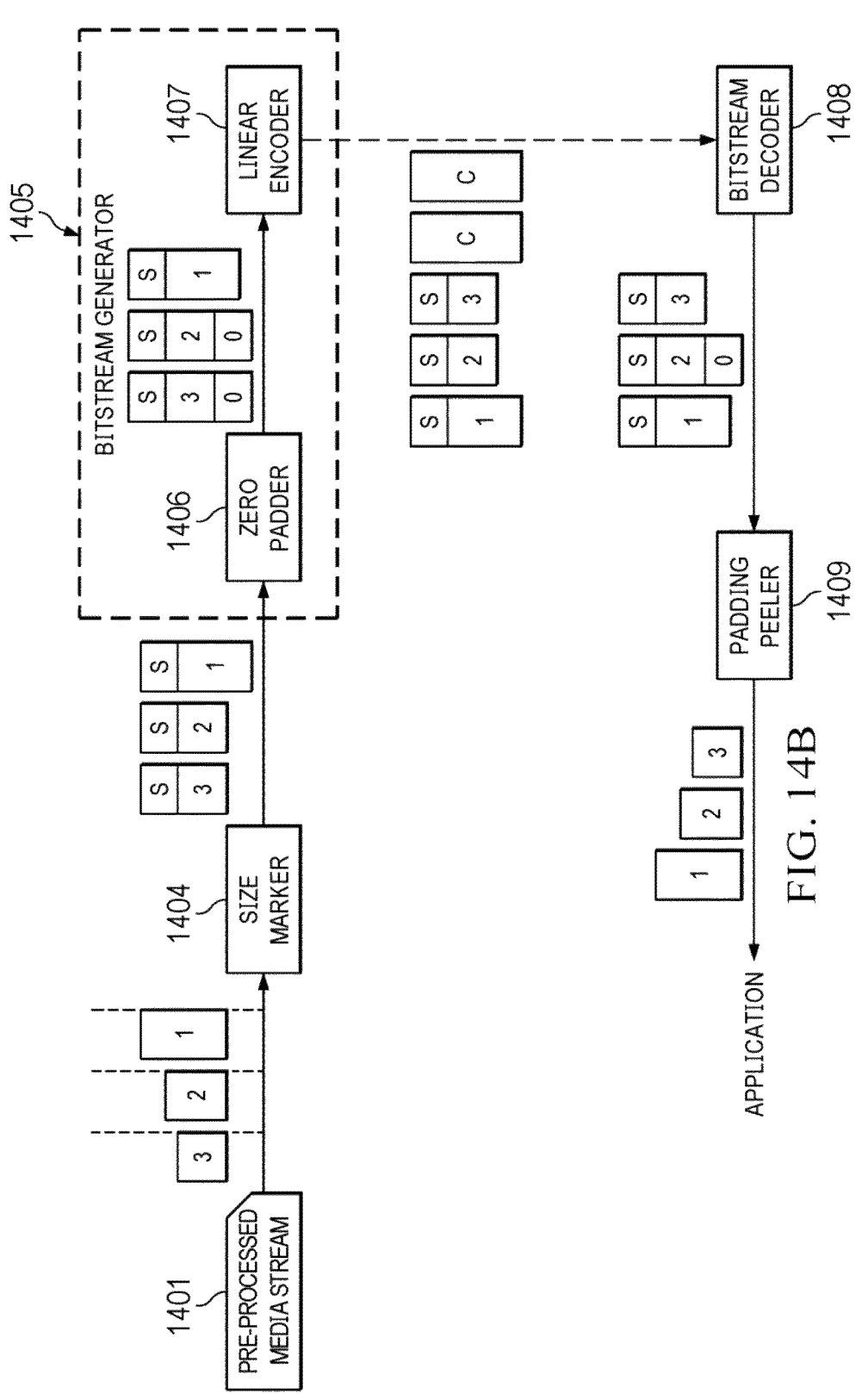
FIG. 14B illustrates handling variable data size off-band, according to some embodiments.

FIG. 14B illustrates handling variable data size off-band via a size marker 1404, according to some embodiments. Pre-processor 1401 generates data in ticks, where each tick's data may have a different size. In some embodiments, size marker 1404 measures the size of each tick data and prepends the size information to the tick data before sending it to bitstream generator 1405. This size information is included in the data from the perspective of bitstream generator 1405 and is linear encoded. In the example shown, there are 3 ticks of data: P1, P2, and P3. Their size is prepended by size marker 1404 which becomes part of the data.

Inside bitstream generator 1405, zero padder 1406 pads the data with zeros to equalize their length for linear encoding. In some embodiments, the length is the largest tick data among the ticks to be encoded together. In some embodiments, a global maximum length is applied. In the example shown, 3 ticks are linear encoded together, and since P1 is the largest, the symbol length is set to the length of the size prepended P1. Thus, P2 and P3 are padded with zeros before linear encoding.

When transmitting the tick data as systematic PACKET subatoms 309, the padded zeros do not need to be transmitted. This is because when bitstream decoder 1408 receives a systematic PACKET subatom 309, it can directly pass the symbol inside PACKET subatom 309 to padding peeler 1409 described below. Padding peeler 1409 parses the size and realizes that there are no zeros to peel. Padding peeler 1409 removes the size prefix and passes the tick data back to the application.

In the example shown, assume P3's transmission as a systematic PACKET subatom 309 is successful, so bitstream decoder 1408 receives size-prepended P3 without zero-padding. and passes it padding peeler 1407. Setting the b_systematic flag to True in the PACKET subatom 309 is used to make the decision. When bitstream decoder 1408 receives an encoded PACKET subatom 309, through the size of the encoded symbol, it knows how many zeros it should pad to the systematic symbols it has received to enable the decoding.

If a systematic symbol is retrieved via decoding, then bitstream decoder 1408 does not know how many zeros have been padded. In this case, bitstream decoder 1408 passes the zero-padded symbol to padding peeler 1409, and padding peeler 1409 parses the size information and peel accordingly. In the example shown. assume the transmission of P2's systematic PACKET subatom 309 is failed, then P2 is retrieved via decoding. The decoded P2 has zeros padded to it, which will be removed by padding peeler 1409 after parsing the size information.

Figure 15A:
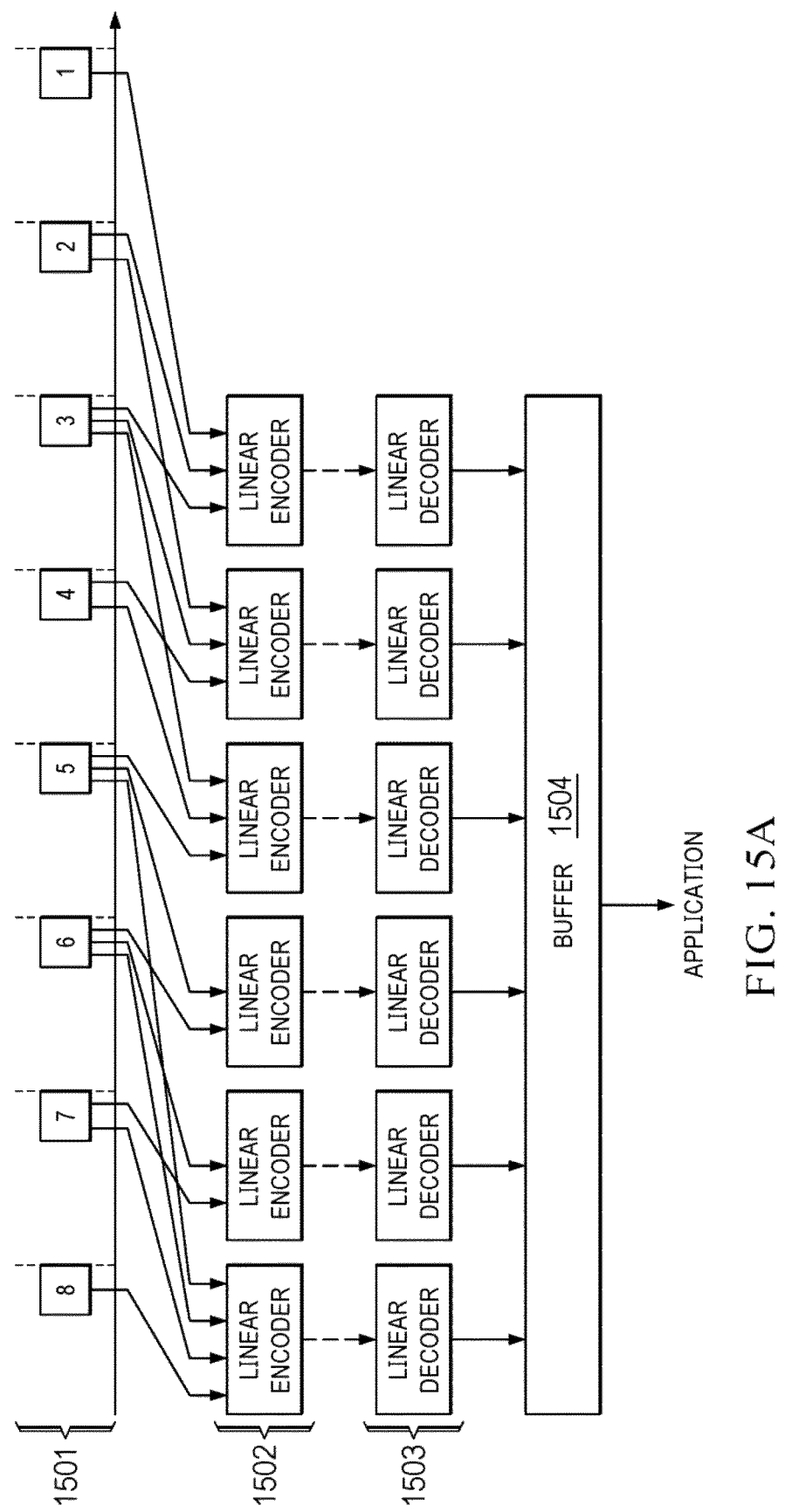
FIG. 15A illustrates low-latency unicast encoding with separate linear encoder-decoder pairs, according to some embodiments.

FIG. 15A illustrates low-latency unicast, separate linear encoder-decoder pairs, according to some embodiments. In particular, FIG. 15A demonstrates a method of protecting multiple ticks of data 1501 using the disclosed bitstream implementation, with a focus on linear encoding and decoding. In this method, for each tick, one linear encoder 1502 is created. This linear encoder 1502 treats the data from this tick and a few older ticks as a block and applies linear coding to this block. At the receiver side, each linear encoder 1502 is paired with a linear decoder 1503, which decodes the data of the corresponding block, and passes the decoded tick data either directly to the application, or to buffer 1504 that re-orders the tick data and removes duplicates.

The method described above can be implemented in an adaptive way. For example, the number of ticks to be encoded together can be made dynamic based on factors such as the network quality, system latency budget and other suitable factors. For another example, the ticks when an encoder should be created can also be decided dynamically based on factors such as the network quality and system latency budget, instead of one encoder per tick.

Figure 15B:
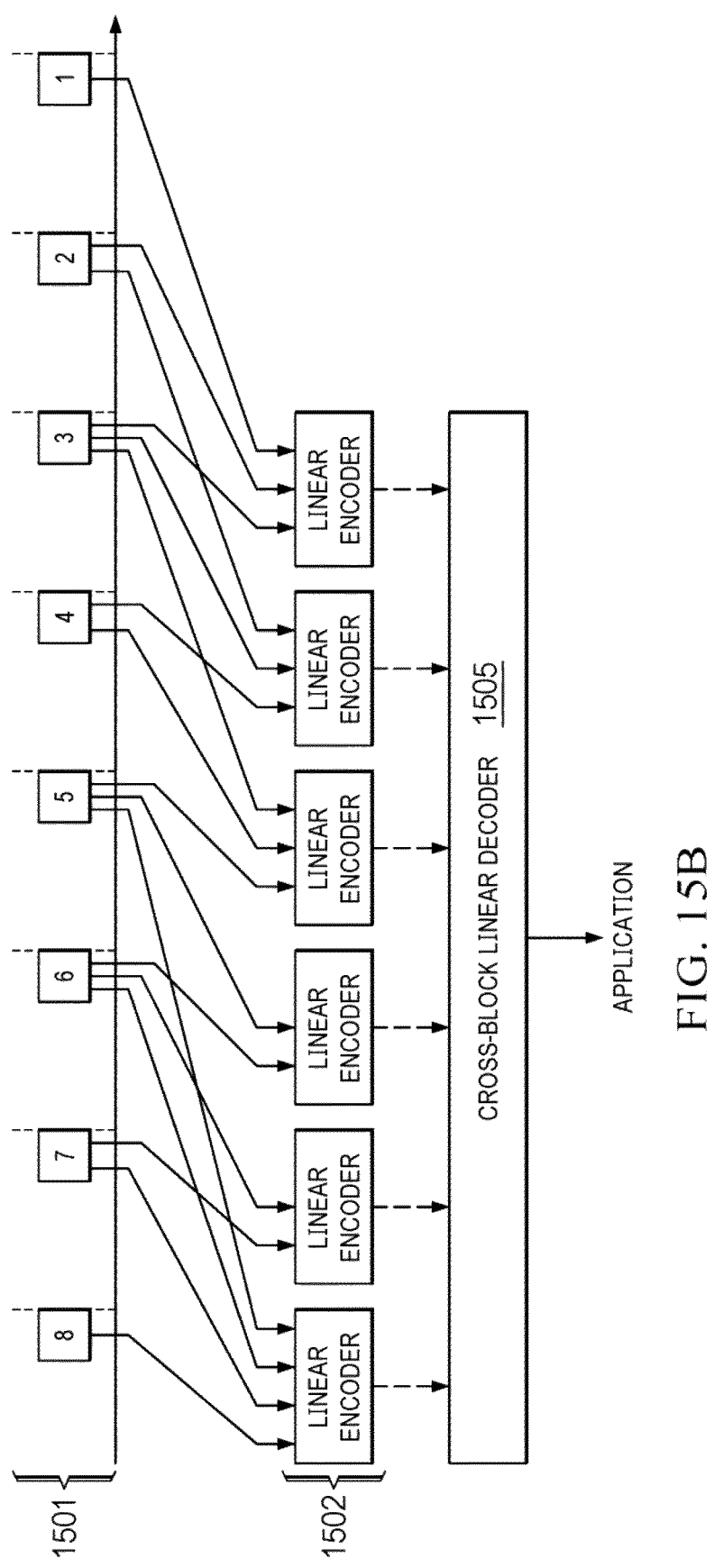
FIG. 15B illustrates a low-latency unicast encoding with a cross-generation decoder, according to some embodiments.

FIG. 15B illustrates a low-latency unicast with a cross-generation decoder, according to some embodiments. In particular, FIG. 15B demonstrates a method of protecting multiple ticks of data 1501 using the disclosed bitstream 301, with a focus on the linear encoding and decoding. In this method, for each tick, one linear encoder 1502 is created. This linear encoder treats the data from this tick and a few older ticks as a block and applies linear coding to this block. At the receiver side, cross-block linear decoder 1505 is implemented, which collects PACKET subatoms 309 from one or more blocks and decodes them together, e.g., by solving an extended set of linear equations. Cross-block decoder 1505 also re-orders the tick data and removes duplicates, and then passes the data to the application layer of the receiver.

In some embodiments, the method described above can be implemented in an adaptive way. For example, the number of ticks to be encoded together can be made dynamic based on factors such as the network quality and system latency budget. For another example, the number of blocks cross-block decoder 1505 will decode together can also be decided dynamically based on factors such as the network quality and system latency budget.

Figure 16:
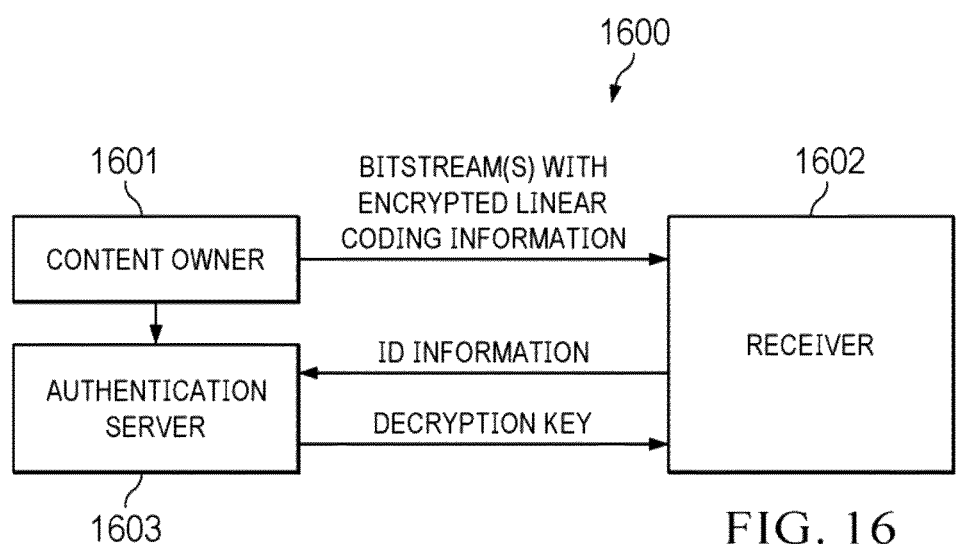
FIG. 16 illustrates using the disclosed bitstream for digital rights management (DRM), according to some embodiments.

FIG. 16 illustrates system 1600 that uses the disclosed bitstream 301 for digital rights management (DRM), according to some embodiments. In particular, FIG. 16 demonstrates how the proposed bitstream can enable simple digital right protection. To decode or re-encode the linear encoded media data, receiver 1602 obtains linear coding information, such as the coding coefficients, generation size, packet size, random seed, etc. Otherwise, receiver 1602 is not able to recover the media data. Therefore, by encrypting such information in the corresponding subatoms of the proposed bitstream, content owner 1601 can prevent unauthorized access to the media data. This enables a simple DRM system using the proposed bitstream.

In some embodiments, when preparing the content, content owner 1601 encrypts the linear coding information using a certain cryptographic encryption scheme (e.g., such as AES). The encrypted bitstream is then distributed via communication networks to receiver 1602. Content owner 1601 then stores the decryption key to authentication server 1603. Authentication server 1603 authenticates receiver 1602 based on its ID and sends the decryption key to receiver 1602 if the authentication is passed. Receiver 1602 then uses the decryption key to decrypt the linear coding information and uses the information to decode or re-encode the media data.

Figure 17:
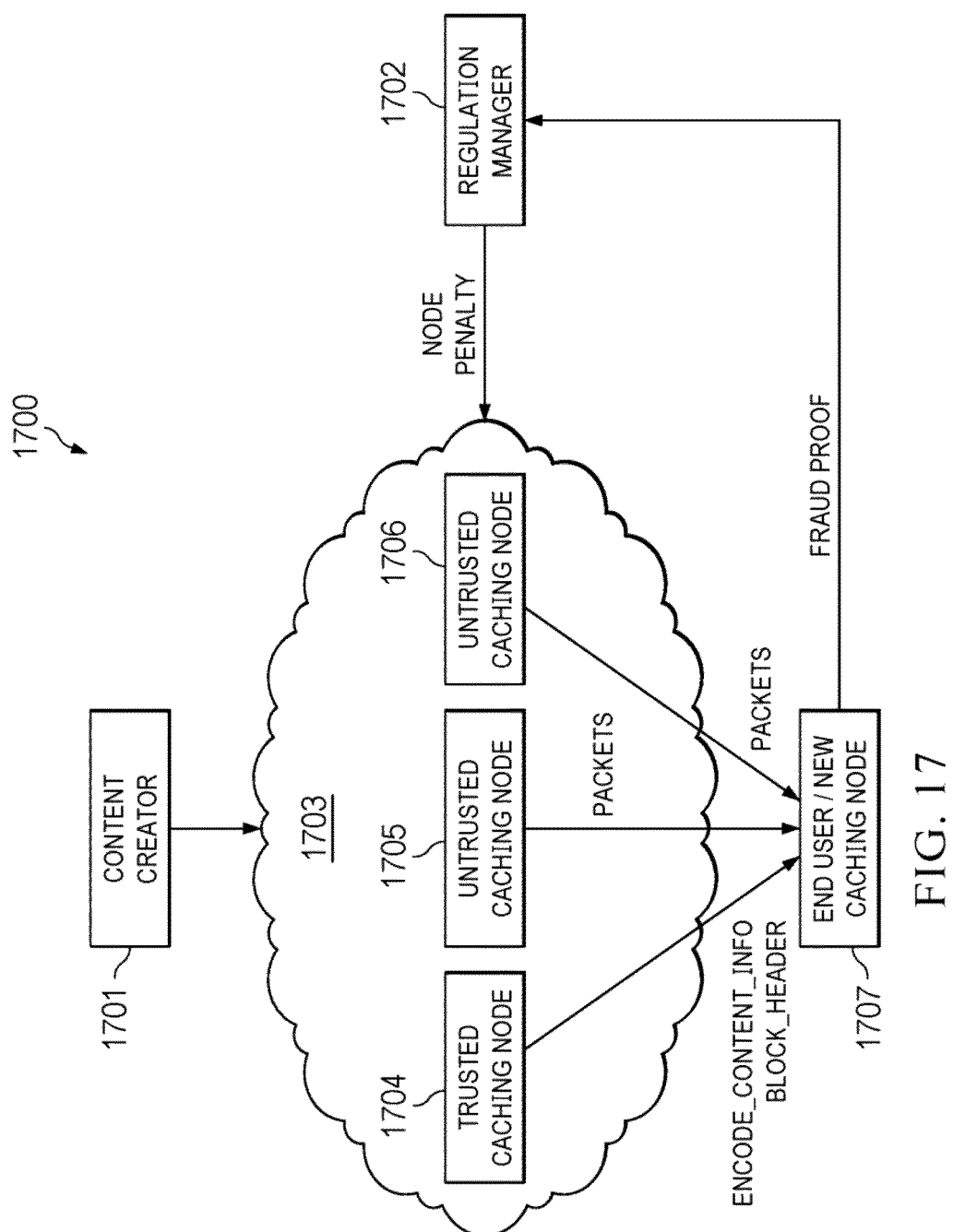
FIG. 17 is a block diagram of a decentralized media delivery system with data authentication enabled by the disclosed bitstream, according to some embodiments.

FIG. 17 is a block diagram of a decentralized media delivery system 1700 with data authentication, according to some embodiments. In particular, FIG. 17 demonstrates how the disclosed bitstream could enable data authentication in a decentralized media delivery system, in which there may exist untrusted caching nodes such as peers.

In the example embodiment shown, content creator 1701 encodes the media data into multiple bitstreams using the disclosed bitstream with the security sealing feature enabled. For example, file integrity can be included in ENCODER_CONTENT_INFO subatom 307, block integrity is included in BLOCK_HEADER subatom 308, and packet integrity is included in PACKET subatom 309. Content creator 1701 then distributes the bitstreams to network 1703 of caching nodes 1704-1706. Although 3 caching nodes are shown in this example, a number of caching nodes can be included in network 1703.

Caching nodes 1704-1706 could store the bitstreams unchanged or create new bitstreams via the re-encoding functionalities enabled by the disclosed bitstream format. Among them, untrusted caching nodes 1705, 1706 may be adversarial and generate a corrupted bitstream, especially PACKET subatoms 309 that are not correctly linear coded.

Receiver node 1707 (can be an end user or new caching node) can authenticate the PACKET subatoms 309 it downloads from untrusted caching nodes 1705, 1706 by first downloading the correct ENCODER_CONTENT_INFO subatom 307 and BLOCK_HEADER subatom 308 to obtain file integrity information and block integrity information. Such information. when generated appropriately (e.g., using homomorphic hashing), can be used to verify the integrity of the PACKET subatoms 309 generated by untrusted nodes.

To download the correct ENCODER_CONTENT_INFO subatom 307 and BLOCK_HEADER subatom 308, receiver node 1707 can use trusted caching nodes 1704, such as those operated by authorized parties. Alternatively, since ENCODER_CONTENT_INFO subatom 307 and BLOCK_HEADER subatom 308 are static for each media asset, content creator 1701 can cryptographically sign these two subatoms, so that receiver 1707 can download these two subatoms from anywhere and verifies them through the cryptographic signature of content creator.

In addition, when receiver node 1707 finds that the received PACKET subatom 309 from a node is corrupted, it can report this breach to regulation manager 1702 of system 1700 by submitting, e.g., a forensic fraud proof. Regulation manager 1702 can then penalize the wrong-doing node by means such as fine, cancel subscription, and blacklist this node from network 1703.

Example Processes

FIG. 18 is a flow diagram of a process 1800 of generating a bitstream from non-linear or linear coded data, according to some embodiments. Process 1800 can be implemented using, for example, the electronic device architecture disclosed in reference to FIG. 22.

Process 1800 includes the steps of: at a first device: receiving media data representing a media asset (1801); obtaining a first plurality of data elements including at least one of bitstream identification data content-specific encode data and media segment data (1802); encoding at least a portion of the media data in accordance with a first linear coding process into coded data corresponding to the media asset (1803); generating a second plurality of data elements different from the first plurality of data elements based on information associated with the first linear coding process (1804); combining the first plurality of data elements and the second plurality of data elements into one or more coded bitstreams representing the media asset (1805); and transmitting the one or more coded bitstreams to one or more devices using one or more network paths (1806).

In some embodiments, process 1800 is implemented by one or more devices, including but not limited to: one or more servers (e.g., a content delivery network (CDN) server, Point-of-presence (PoP) server, one or more application servers (e.g., a server hosting an electronic news gathering application, content broadcasting application, unicast application, etc.), content cache, peer device, local caching device, edge device (e.g., 5G/6G edge application server) or client device (e.g., a media consumption devices, computer, mobile device, gaming system, streaming device, audio/video equipment, etc.).

In some embodiments, a media asset includes but is not limited to: images, video, game state, game command data, etc.

In some embodiments, media data includes but is not limited to: source coded data, data packaged in accordance with a streaming protocol (e.g., HLS (HTTP-like streaming), DASH (dynamic adaptive streaming over HTTP), etc. In some embodiments, the media data is linear coded data or a coded bitstream associated with the media asset (e.g., a coded bitstream including coded content and associated metadata). In some embodiments, the media data representing a media asset is received from a plurality of network paths.

In some embodiments, media segment data identifies characteristics of the media asset in a respective segment or block (e.g., MEDIA_SEGMENT_INFO). In some embodiments, the first plurality of data elements includes metadata associated with (e.g., derived from, corresponding to, received with) the media asset (e.g. SYNC and MEDIA_SEGMENT_INFO subatoms. In some embodiments, the first plurality of data elements does not include linear coded payload data.

In some embodiments, encoding in accordance with a first linear coding process (e.g., a linear coding process corresponding to a supported linear code type) includes applying a linear encoding technique to packets comprising the at least first portion of the media data (e.g., including generating coded packets that are combinations of a plurality of packets corresponding to the at least one portion of the media data.

In some embodiments, encoding in accordance with a first linear coding process is performed without applying a linear coding technique to the at least one portion of the media data (e.g., a process not including creating coded packets by combining a plurality of packets corresponding to the at least one portion of the media data). For example, the encoding process may include applying a mapping function (e.g., one or more mapping rules or tables) associated with the first linear coding process to transform the at least a portion of the media data into coded data without requiring application of the first linear coding process.

In some embodiments, the second plurality of data elements includes coded payload data and metadata associated with the media asset (e.g., one or more of BITSTREAM_HEADER subatom 305, ENCODER_CONTENT_INFO subatom 307, BLOCK_HEADER subatom 308, PACKET subatom 309, or PACKET_HEADER_ONLY subatom 312 and their associated bitfields).

In some embodiments, combining includes interleaving, multiplexing or otherwise converting into a sequential signal or representation for transmission or storage.

In some embodiments, the one or more network paths include more than one network, more than one network type (e.g., LAN, VLAN, WAN, SAN, WLAN, VPN, etc.), more than one network standards (e.g., 1G/2G/3G/4G/5G/6G mobile, Bluetooth, 802.11-based WIFI, etc.), more than one network transmission medium (e.g., wireless, wired, fiber, etc.), communication channels with different performance characteristics (e.g., channels utilizing lossy protocols, reliable protocols, lower latency).

FIG. 19 is a flow diagram of a process 1900 of decoding/re-encoding, according to some embodiments. Process 1900 can be implemented using, for example, the electronic device architecture disclosed in reference to FIG. 22.

Process 1900 includes the steps of: at a first electronic device: receiving one or more coded bitstreams associated with a media asset (1901); storing the one or more coded bitstream in a buffer (1902); processing the one or more coded bitstreams stored in the buffer, the processing including: extracting a first plurality of data elements including at least one of bitstream identification, content-specific encode data and media segment data from the one or more coded bitstreams (1903); extracting a second plurality of data elements including information from the one or more coded bitstreams that is associated with respective linear coding processes used to generate the one or more code bitstreams (1904); and performing at least one of: generating decoded data representing the media asset based the second plurality of data elements, or generating newly coded data representing the media asset based the second plurality of data elements (1905).

In some embodiments, the first device is a server (e.g., a content delivery network (CDN) server, Point-of-presence (PoP) server, application server (e.g., a server hosting an electronic news gathering application, content broadcasting application, unicast application, etc.)), content cache, peer device, local caching device, edge device (e.g., 5G/6G edge application server), client device (e.g., a media consumption devices, computer, mobile device, gaming system, streaming device, audio/video equipment, etc.).

In some embodiments, the one or more coded bitstreams include bitstreams encoded according to one of at least two different linear coding protocols/standards.

In some embodiments, the processing includes demultiplexing and/or parsing.

In some embodiments, media segment data is used to identify characteristics of the media asset in a respective segment or block) (e.g., MEDIA_SEGMENT_INFO subatom 306).

In some embodiments, the first plurality of data elements includes metadata associated with (e.g., derived from, corresponding to, received with) the media asset (e.g. SYNC subatom 304 and MEDIA_SEGMENT_INFO subatom 306).

In some embodiments, the first plurality of data elements does not include linear coded payload data.

In some embodiments, the second plurality of data elements includes coded payload data and metadata associated with the media asset (e.g., one or more of BITSTREAM_HEADER subatom 305, ENCODER_CONTENT_INFO subatom 307, BLOCK_HEADER subatom 308, PACKET 309, PACKET_HEADER_ONLY 312 subatom, etc.).

In some embodiments, the coded data corresponds to a different one of the least two different linear coding protocols/standards.

Figure 20:
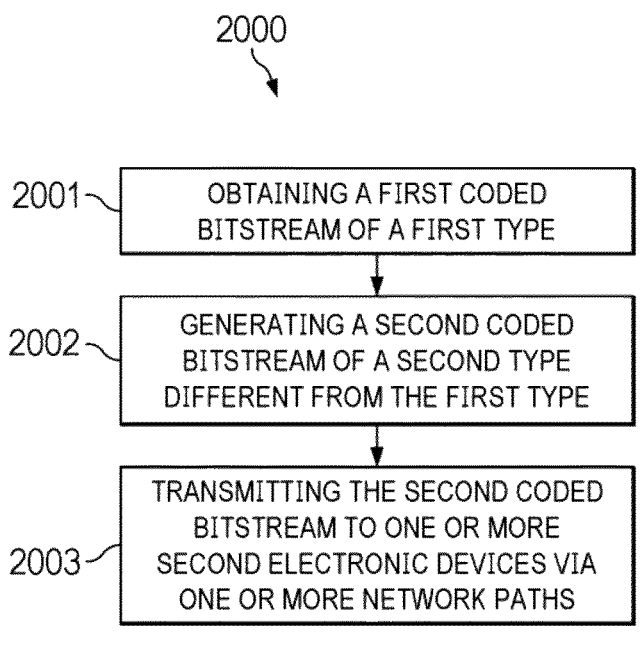
FIG. 20 is a flow diagram of a process of converting a new code type for downstream compatibility, according to some embodiments.

FIG. 20 is a flow diagram of a process 2000 of converting a new code type for downstream compatibility, according to some embodiments. Process 2000 can be implemented using, for example, the electronic device architecture disclosed in reference to FIG. 22.

Process 2000 includes the steps of: at a first electronic device: obtaining a first coded bitstream of a first type (2001); generating a second coded bitstream of a second type different from the first type (2002); and transmitting the second coded bitstream to one or more second electronic devices via one or more network paths (2003).

In some embodiments, the first bitstream of a first type is generated according to a first type of linear coding protocol or standard (e.g., RaptorQ™).

In some embodiments, the first or the second bitstreams include systematic packets associated with a data segment and non-systematic packets associated with the data segment.

In some embodiments, the first or the second bitstreams include systematic packets associated with the data segment and does not include non-systematic packets associated with the data segment.

In some embodiments, the first or the second bitstreams include non-systematic packets associated with the data segment and does not include systematic packets associated with the data segment.

In some embodiments, the second bitstream of a second type is generated according to a second type of linear coding protocol or standard (e.g., Reed Solomon code).

In some embodiments, the one or more network paths include more than one network, more than one network type (e.g., LAN, VLAN, WAN, SAN, WLAN, VPN, etc.), more than one network standards (e.g., 1G/2G/3G/4G/5G/6G mobile, Bluetooth, 802.11-based WIFI, etc.), more than one network transmission medium (e.g., wireless, wired, fiber, etc.), communication channels with different performance characteristics (e.g., channels utilizing lossy protocols, reliable protocols, lower latency protocols), etc.).

FIG. 21 is a flow diagram of another process of converting a new code type for downstream compatibility, according to some embodiments. Process 2100 can be implemented using, for example, the electronic device architecture disclosed in reference to FIG. 22.

Process 2100 includes the steps of: at a first electronic device: receiving a first bitstream associated with a media asset encoded with a first type of linear coding (2101); in accordance with the determination that the first bitstream should be decoded with a decoder associated with a second type of linear coding, processing the first bitstream into a second bitstream of a second type of linear coding, including: extracting data from a set of fields of the first bitstream and mapping the data to a second and corresponding set of fields of the second bitstream (2102); extracting metadata associated with the media asset from the first bitstream (2103); decoding the second bitstream into to an uncoded representation of the media asset with a linear decoder associated with the second type of linear coding (2104); in accordance with the determination that the first bitstream should not be decoded with a decoder associated with a second type of linear coding, processing the first bitstream, including: decoding the first bitstream into an uncoded representation of the media asset with a linear decoder associated with the first type of linear coding and metadata associated with the media asset (2105); and delivering the uncoded representation of the media asset to an application with the extracted metadata associated with the media asset (2106).

The processes 1800, 1900, 2000 and 2100 disclosed above each allow for combining data elements associated with a linear coding process with data elements including at least one of bitstream identification data, content-specific encode data and media segment data prior to transmission, to enable more efficient delivery of the media data to/from devices with various processing capabilities (e.g., encoding/decoding capabilities) through networks with different performance characteristics. The combined data provides more efficient decoding and reduces the need to generate and transmit multiple redundant types of bitstreams to ensure compatibility, thereby saving networking and processing resources.

Example System Architecture

Figure 22:
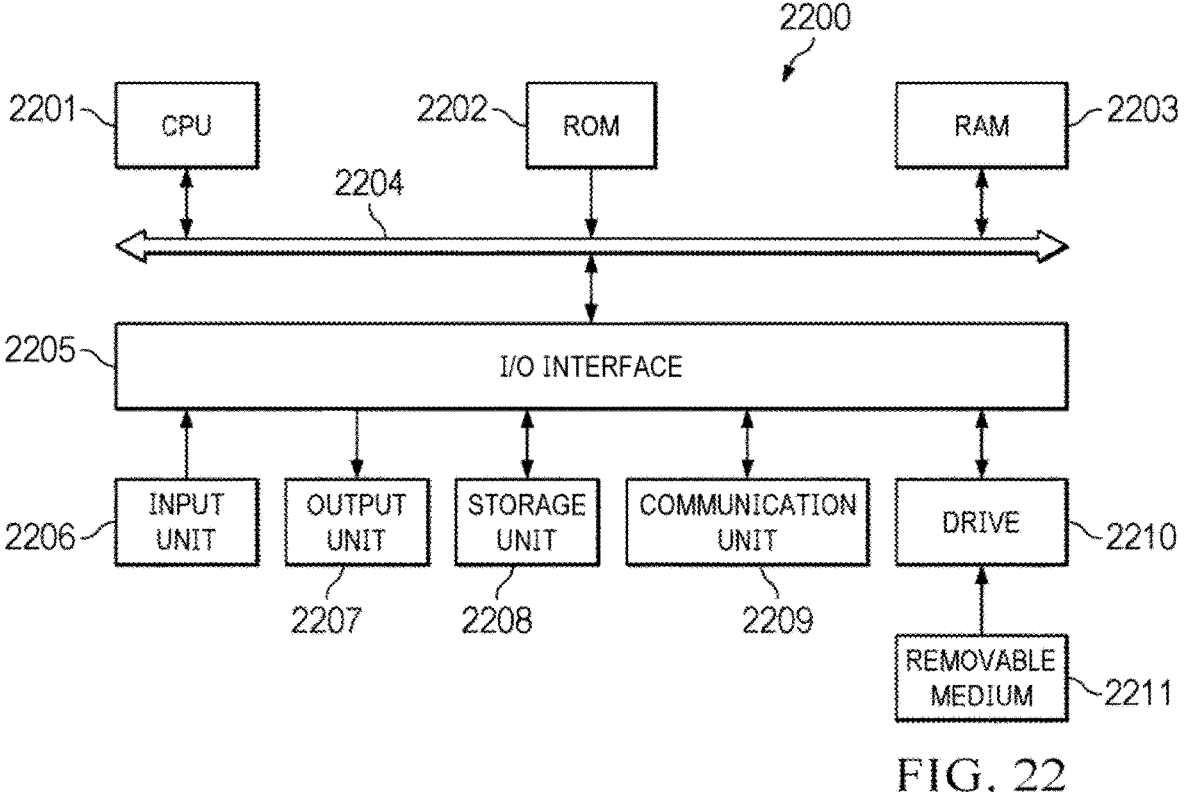
FIG. 22 is a block diagram of an example hardware architecture suitable for implementing the systems and methods described in reference to FIGS. 1-21.

FIG. 22 shows a block diagram of an example electronic device architecture 2200 suitable for implementing example embodiments of the present disclosure. Architecture 2200 includes but is not limited to servers and client devices, as previously described in reference to FIGS. 1-21.

As shown, the architecture 2200 includes central processing unit (CPU) 2201 which is capable of performing various processes in accordance with a program stored in, for example, read only memory (ROM) 2202 or a program loaded from, for example, storage unit 2208 to random access memory (RAM) 2203. In RAM 2203, the data required when CPU 2201 performs the various processes is also stored, as required. CPU 2201, ROM 2202 and RAM 2203 are connected to one another via bus 2204. Input/output (I/O) interface 2205 is also connected to bus 2204.

The following components are connected to I/O interface 2205: input unit 2206, that may include a keyboard, a mouse, or the like; output unit 2207 that may include a display such as a liquid crystal display (LCD) and one or more speakers; storage unit 2208 including a hard disk, or another suitable storage device; and communication unit 2209 including a network interface card such as a network card (e.g., wired or wireless).

In some implementations, input unit 2206 includes one or more microphones in different positions (depending on the host device) enabling capture of audio signals in various formats (e.g., mono, stereo, spatial, immersive, and other suitable formats).

In some implementations, output unit 2207 include systems with various number of speakers. Output unit 2207

(depending on the capabilities of the host device) can render audio signals in various formats (e.g., mono, stereo, immersive, binaural, and other suitable formats).

In some embodiments, communication unit 2209 is configured to communicate with other devices (e.g., via a network). Drive 2210 is also connected to I/O interface 2205, as required. Removable medium 2211, such as a magnetic disk, an optical disk, a magneto-optical disk, a flash drive or another suitable removable medium is mounted on drive 2210, so that a computer program read therefrom is installed into storage unit 2208, as required. A person skilled in the art would understand that although system 2200 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 2209, and/or installed from the removable medium 2211, as shown in FIG. 22.

Generally, various example embodiments of the present disclosure may be implemented in hardware or special purpose circuits (e.g., control circuitry), software, logic or any combination thereof. For example, the units discussed above can be executed by control circuitry (e.g., CPU 2201 in combination with other components of FIG. 22), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

Other Embodiments

In some embodiments, encoding in accordance with a first linear coding process (e.g., a linear coding process corresponding to a supported linear code type) includes applying a linear encoding technique to packets comprising at least a first portion of the media data (e.g., including generating coded packets that are combinations of a plurality of packets corresponding to the at least one portion of the media data.

In some embodiments, encoding in accordance with a first linear coding process is performed without applying a linear coding technique to the at least one portion of the media data (e.g., a process not including creating coded packets by combining a plurality of packets corresponding to the at least one portion of the media data. For example, the encoding process may include applying a mapping function (e.g., one or more mapping rules or tables) associated with the first linear coding process to transform the at least a portion of the media data into coded data without requiring application of the first linear coding process.

Advantages of Disclosed Embodiments

The disclosed bitstream provides the following advantages.

1. The disclosed embodiments support the use of multiple linear coding techniques within the same bitstream, including any linear code including but not limited to block codes.
2. The disclosed embodiments contain metadata that allows the media asset to be encoded, distributed, re-encoded, cached, over a multi-source multi-path media data delivery systems and then decoded at the delivery point.
3. The disclosed bitstream 301 (subatoms and metadata) allows multi-source multi-path delivery without the need of centralized control and without coordination between the sources, and enables minimum redundancy at the delivery point.
4. The disclosed embodiments allows a subatom system to send different types of data using different methods, which enables flexible and heterogenous delivery of different subatoms. For example, some subatoms, such as metadata, can go down a reliable channel and others, such as media essence, can go down unreliable channels. Some subatoms can be encrypted, and some can be un-encrypted.

5. The disclosed embodiments allow a flexible bitstream subatom size that fits the communication protocol data unit size through the use of CHUNKED_SUBATOM subatoms.

6. The disclosed embodiments allow the chunking of a media asset into smaller blocks and then applying linear code to different blocks separately by using the block_index field of the BLOCK_HEADER subatom to indicate different blocks.

7. The disclosed embodiments allow linear re-encode of the encoded data within specific subatoms without changing the subatom structure (e.g., the output is the same subatom structure and can be consumed by the decoder with no changes).

8. The disclosed embodiments allow the creation of variously sized functionally equivalent coded copies to meet the storage constraint of different devices without changing the sub atom structure.

9. The disclosed embodiments support the ability to encode a media asset with a plurality of different linear codes and delivered via a plurality of sources (e.g., CDNs), and when this plurality of bitstreams are available at the decode location, they can be decoded using the same bitstream decoder.

10. The disclosed embodiments support the ability to linear re-encode a media asset that has been encoded with a plurality of different linear codes and delivered via a plurality of sources (e.g., CDNs), and when this plurality of bitstreams are available at the re-encode location, they be re-encoded using the same bitstream codec.

11. The disclosed embodiments allow conversion of a media asset which has been encoded into a bitstream using an existing standardized linear code format (e.g., RaptorQ, R-S) then this standardized bitstream can be mapped into the proposed bitstream via a mapping function. A demapping function is applied at the decoder of the proposed bitstream to recover the original standardized bitstream back into the standardized format.

12. The disclosed embodiments support selection and use of a linear code which is a sliding window or block code. The format allows the decoder to use either block or sliding window decodes if a sliding window code is used at the encoder.

13. The disclosed embodiments support delivery of a low-latency lossy media data unicast systems via selection of the appropriate linear code (e.g., support for sliding window codes) and subatoms which can be sent through reliable channels while the media asset is sent via an unreliable channel.

14. The disclosed embodiments enable encryption of selected sub atom and fields in the bitstream to prevent an un-authorized decoder to recover the media asset (e.g., DRM).

15. The disclosed embodiments support different levels of data integrity checks (e.g., file level, block level, and packet level checks) with fields that carry authentication information. In particular, it supports the use of special hashing algorithms such as homomorphic hashing to enable integrity check of linear coded packets without decoding.

Additionally, the disclosed bitstream generator provides the following advantages.

1. The disclosed bitstream generator can chunk subatoms to smaller pieces (CHUNKED_SUBATOM subatoms 311) to fit communication protocol data unit size.

2. The disclosed bitstream generator can chunk a media asset into smaller blocks and then apply linear code to different blocks separately and use block_index field of BLOCK_HEADER subatom to indicate different blocks.

3. The disclosed bitstream generator can create multiple different bitstreams using a subatom multiplexer, and the different bitstreams can be delivered to different network entities.

4. The disclosed bitstream generator can receive channel information and use it to adapt encoding scheme.

5. The disclosed bitstream generator selects a linear coding technique from a plurality of linear coding techniques for encoding media into a bitstream by signaling this with subatom BITSTREAM_HEADER using field linear_code_type.

6. The disclosed bitstream generator can generate a plurality of linear coded variants of the same media asset by putting, at different variants, the same media information (such as the same SYNC, BITSTREAM_HEADER, ENCODER_CONTENT_INFO, and MEDIA_SEG_INFO subatoms) to uniquely identify this media asset, while putting different linear code information (such as different prng_seed in BLOCK_HEADER subatom, different poly_index and different coefficients in PACKET subatom) to differentiate the variants. This way, the variants can be distributed over a multi-source data delivery system and can all contribute to the decoding of the media asset.

7. The disclosed bitstream generator can signal whether a block code or sliding window code is used through various fields, such as setting the linear_code_type field of the BITSTREAM_HEADER subatom to different values. setting the content_source_size field of the BITSTREAM_HEADER subatom to zero for sliding window code, and/or using dynamic window_start_index and window_end_index of the PACKET subatom for sliding window code.

8. The disclosed bitstream generator can dynamically change the linear coding technique and parameters based on receiver feedback.

9. the disclosed bitstream generator can encrypt the coding information (such as the coefficient_vector field of PACKET subatom) and carry the coding information separately (such as using the PACKET_HEADER_ONLY subatom) to prevent unauthorized decoding of the media asset.

10. the disclosed bitstream generator can hash the media asset in various ways (hash the file, hash a block, hash original symbols, etc.) using various hashing techniques (SHA2, SHA256, homomorphic hashing, etc.) to enable data integrity check. In particular, it can use special hashing algorithms such as homomorphic hashing to enable integrity check of linear coded packets without decoding.

Additionally, the disclosed bitstream re-encoder embodiments provide the following advantages.

1. The disclosed bitstream re-encoder can be implemented at different network entities to perform bitstream re-encoder and generate functionally equivalent full coded copies and partial coded copies without coordinating with each other.
2. The disclosed bitstream re-encoder can identify and re-encode using different linear coded variants of the same media asset through the same media information (such as the same SYNC, BITSTREAM_HEADER, ENCODER_CONTENT_INFO, and MEDIA_SEG_INFO subatoms) and different linear code information (such as different prng_seed in BLOCK_HEADER subatom, different poly_index and different coefficients in PACKET subatom) from different variants.
3. The disclosed bitstream re-encoder can unify and re-encode different bitstreams of the same media asset generated using different linear codes.
4. The disclosed bitstream encoder can decrypt (for re-encoding) and re-encrypt the coding information (such as the coefficient_vector field of PACKET subatom) and carry the coding information separately (such as using the PACKET_HEADER_ONLY subatom) to prevent unauthorized decoding of the media asset.
5. The disclosed bitstream re-encoder can verify the integrity of media asset in various ways (file verification, block verification, packet verification, etc.) according to the hashing techniques (SHA2, SHA256, homomorphic hashing, etc.) and the data integrity fields specified in the subatoms. In particular, when special hashing techniques such as homomorphic hashing is used, it can verify linear coded packets without decoding.

Additionally, the disclosed bitstream decoder embodiments provide the following features/advantages.

1. The disclosed bitstream decoder can identify and download a plurality of different bitstreams of the same media asset and use them to decode the media asset.
2. The disclosed bitstream decoder can decode different blocks of the same media asset separately and concatenate them in the correct order to recover the original media asset by using the block_index field of BLOCK_HEADER subatom as the indicator.
3. The disclosed bitstream decoder can recover a complete subatom using multiple CHUNKED_SUBATOM subatoms by using the associated fields in the CHUNKED_SUBATOM subatoms (such as original_subatom_id, chunk_size, chunked_segment_index, num_chunked_segments) as the connector, by using a buffer to temporarily store CHUNKED_SUBATOM subatoms that cannot be recovered yet, and by using a merger to attempt the recovery).
4. The disclosed bitstream decoder can unify and decode the media asset using bitstreams generated using different linear codes.
5. The disclosed bitstream decoder supports various types of decoding such as block decoding and sliding window decoding based on the encoding scheme and latency requirement.
6. The disclosed bitstream decoder can identify whether a block code or sliding window code is used through various fields, such as the linear_code_type field of the BITSTREAM_HEADER subatom, the content_source_size field of the BITSTREAM_HEADER subatom, and/or the window_start_index and window_end_index of the PACKET subatom.
7. The disclosed bitstream decoder can identify the linear code type to properly decode the bitstream from a plurality of linear coding techniques by reading the BITSTREAM_HEADER subatom and field linear_code_type.
8. The disclosed bitstream decoder can identify and decode using different linear coded variants of the same media asset through the same media information (e.g., the same SYNC, BITSTREAM_HEADER, ENCODER_CONTENT_INFO, and MEDIA_SEG_INFO subatoms) and different linear code information (such as different prng_seed in BLOCK_HEADER subatom, different poly_index and different coefficients in PACKET subatom) between different variants.
9. The disclosed bitstream decoder identifies whether of a linear code is a sliding window or block code using a combination of windows size and generation size.
10. The disclosed bitstream decoder can analyze channel information based on the received subatoms and report the information to the generator for informed encoding decision making.
11. The disclosed bitstream decoder can decrypt the coding information (such as the coefficient_vector field of PACKET subatom) to enable the decoding of the media asset.
12. The disclosed bitstream decoder can verify the integrity of media asset in various ways (file verification, block verification. packet verification, etc.) according to the hashing techniques (SHA2, SHA256, homomorphic hashing, etc.) and the data integrity fields specified in the subatoms. In particular, when special hashing techniques such as homomorphic hashing is used, it can verify linear coded packets without decoding.

Additionally, the disclosed embodiments provide:
1. a mechanism for handling variable-size data packets using a preliminary treatment of the data before the linear code. Thus, the bitstream is unaware that the media is in variable size packets.
2. a system that can enable low latency delivery of media stream by sending certain subatoms which are not time sensitive but critical for decoding over a reliable but not latency sensitive connection (TCP), and sending the encoded media stream over unreliable (and low latency) connections.
3. a multi-path multi-source media delivery system, where the origin server generates different functionally equivalent linear coded copies of the same media asset for different caches, new caches can re-encode existing copies to obtain new functionally equivalent linear coded copies, and the receiver downloads data from a plurality of sources/caches to recover the original media asset;
4. a DRM system, where the content creator encrypts the linear coding information and only give decryption keys to authorized parties. This way, only authorized parties are able to re-code and decode the content;
5. a decentralized media delivery system that allows data integrity authentication, where network entities can use the data integrity fields of the disclosed bitstream to verify the integrity of the received data and submit fraud proofs against adversarial nodes to a regulation manager for penalization;
6. enables coded multisource delivery of media and/or data on both wireless uplink and downlink channels.

An example embodiment for uplink channels includes electronic news gathering applications; and 7. enables an end-to-end solution supporting coded multisource media generated and formatted as per the disclosed invention for efficient/scalable processing on a 5G/6G edge application server while also allowing the same 5G/6G edge application server to support real-time translation to coded unicast or broadcast traffic for latency sensitive applications.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method comprising:

at a first device:

receiving, with at least one processor, media data representing a media asset;

obtaining, with the at least one processor, a first plurality of data elements including at least one of bitstream identification data, content-specific encode data and media segment data;

encoding, with the at least one processor, at least a portion of the media data in accordance with a first coding process to obtain coded data corresponding to the media asset, wherein the first coding process is an application-layer coding process that includes partitioning the media asset into symbols and coding the symbols;

generating, with the at least one processor, a second plurality of data elements different from the first plurality of data elements, the second plurality of data elements including the coded data and information associated with the first coding process;

combining, with the at least one processor, the first plurality of data elements and the second plurality of data elements into one or more coded bitstreams representing the media asset; and transmitting, with the at least one processor, the one or more coded bitstreams to one or more second devices using one or more network paths.

2. The method of claim 1, wherein the first coding process is a linear coding process to obtain coded data corresponding to the media asset.

3. The method of claim 1, wherein the first coding process is a non-linear coding process that transforms the media data into the coded data consistent with another linear coding process.

4. The method of claim 1, wherein the first plurality of data elements includes bitstream identification data and at least one of content specific encode data or media segment data.

5. The method of claim 1, wherein the data elements are data structures.

6. The method according to claim 1, wherein the first plurality of data elements includes a synchronization data element, and each of the one or more coded bitstreams begins with a synchronization data element.

7. The method according to claim 6, wherein the synchronization data element includes at least one of:

identification data identifying a respective coded bitstream of the one or more coded bitstreams as being generated from a common source media asset;

synchronization data for synchronizing the respective coded bitstream of the one or more coded bitstreams with other coded bitstreams generated from the common source media asset; and lineage data of the respective coded bitstream of the one or more coded bitstreams.

8. The method according to claim 1, wherein the first plurality of data elements or the second plurality of data elements are generated based at least in part on system data associated with the received media data.

9. The method according to claim 1, wherein obtaining a first plurality of data elements includes generating the first plurality of data elements from the received media data or system data associated with the received media data.

10. The method according to claim 1, wherein encoding the media data in accordance with a first coding process includes partitioning the media data into a plurality of original symbols and generating a plurality of coded symbols based on the plurality of original symbols.

11. The method according to claim 10, wherein a coded symbol is generated by linearly combining a subset of the plurality of original symbols in accordance with a network coding technique.

12. The method according to claim 1, wherein the media data includes a linear coded bitstream.

13. The method according to claim 1, wherein obtaining a first plurality of data elements includes:

extracting metadata from the media data; and computing the first plurality of data elements from the extracted metadata.

14. The method according to claim 13, wherein metadata is extracted from the media data without performing linear decoding.

15. The method according to claim 1, wherein encoding the media data in accordance with a first coding process includes re-encoding linear coded symbols in the coded bitstream into new linear coded symbols representing the media asset.

16. The method according to claim 1, further comprising:

adding hash data to one or more data elements of the second plurality of data elements enabling at least one of validation, authentication, or integrity by a device receiving the one or more bitstreams.

17. The method according to claim 1, further comprising:

adding hash data to one or more data elements of the second plurality of data elements that are associated with one or more of: a file corresponding to the media asset, a block of the media asset, a segment of the media asset and a packet of the media asset.

18. The method according to claim 1, wherein combining includes inserting a directory data element into the one or more coded bitstreams.

19. The method according to claim 18, wherein the directory data element is used to assist a receiving device in identifying subatoms within each bitstream.

20. The method according to claim 1, wherein the one or more coded bitstreams include a first coded bitstream including data elements of a first type and a second coded bitstream not including data elements of the first type.

21. A non-transitory computer-readable storage medium storing instructions which, when executed by a computing apparatus, cause the computing apparatus to:

receive, with at least one processor, media data representing a media asset;

obtain, with the at least one processor, a first plurality of data elements including at least one of bitstream identification data, content-specific encode data and media segment data;

encode, with the at least one processor, at least a portion of the media data in accordance with a first coding process to obtain coded data corresponding to the media asset, wherein the first coding process is an application-layer coding process that includes partitioning the media asset into symbols and coding the symbols;

generate, with the at least one processor, a second plurality of data elements different from the first plurality of data elements, the second plurality of data elements including at least the coded data and information associated with the first coding process;

combine, with the at least one processor, the first plurality of data elements and the second plurality of data elements into one or more coded bitstreams representing the media asset; and transmit, with the at least one processor, the one or more coded bitstreams to one or more second devices using one or more network paths.

22. A computing apparatus, comprising:

at least one processor; and memory storing instructions, which when executed by the at least one processor, cause the computing apparatus to:

receive, with the least one processor, media data representing a media asset;

obtain, with the at least one processor, a first plurality of data elements including at least one of bitstream identification data, content-specific encode data and media segment data;

encode, with the at least one processor, at least a portion of the media data in accordance with a first coding process to obtain coded data corresponding to the media asset, wherein the first coding process is an application-layer coding process that includes partitioning the media asset into symbols and coding the symbols;

generate, with the at least one processor, a second plurality of data elements different from the first plurality of data elements, the second plurality of data elements including the coded data and information associated with the first coding process;

combine, with the at least one processor, the first plurality of data elements and the second plurality of data elements into one or more coded bitstreams representing the media asset; and transmit, with the at least one processor, the one or more coded bitstreams to one or more second devices using one or more network paths.

23. The method of claim 1, wherein the information associated with the first coding process includes coding coefficients used in the application-layer coding process.

24. The method of claim 1, wherein the information associated with the first coding process includes data identifying the application-layer coding process.

25. The non-transitory computer-readable storage medium of claim 21, wherein the information associated with the first coding process includes coding coefficients used in the application-layer coding process.

26. The non-transitory computer-readable storage medium of claim 21, wherein the information associated with the first coding process includes data identifying the application-layer coding process.

27. The computing apparatus of claim 22, wherein the information associated with the first coding process includes coding coefficients used in the application-layer coding process.

28. The computing apparatus of claim 22, wherein the information associated with the first coding process includes data identifying the application-layer coding process.

* * * * *